US012574787B2

(12) United States Patent
Xin et al.

(10) Patent No.: US 12,574,787 B2
(45) Date of Patent: Mar. 10, 2026

(54) COMMUNICATION METHOD AND APPARATUS FOR IMPROVING ACCURACY OF ADJUSTING AN APPLICATION LAYER PARAMETER BY A SERVICE PROVIDER

(71) Applicant: HUAWEI TECHNOLOGIES CO., LTD., Shenzhen (CN)

(72) Inventors: Yang Xin, Shanghai (CN); Weiwei Chong, Shenzhen (CN); Xiaobo Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 361 days.

(21) Appl. No.: 18/328,165

(22) Filed: Jun. 2, 2023

(65) Prior Publication Data

US 2023/0308930 A1 Sep. 28, 2023

Related U.S. Application Data

(63) Continuation of application No. PCT/CN2020/133449, filed on Dec. 2, 2020.

(51) Int. Cl.
H04L 43/55 (2022.01)
H04W 28/02 (2009.01)

(52) U.S. Cl.
CPC ......... H04W 28/0215 (2013.01); H04L 43/55 (2022.05)

(58) Field of Classification Search
CPC ........................... H04W 28/0215; H04L 43/55
See application file for complete search history.

(56) References Cited

U.S. PATENT DOCUMENTS

| | | | |
|---|---|---|---|
| 2019/0222489 A1 | 7/2019 | Shan | |
| 2020/0358670 A1* | 11/2020 | Lee | ......................... H04L 43/028 |
| 2021/0014141 A1* | 1/2021 | Patil | ...................... H04W 76/25 |
| 2022/0329493 A1* | 10/2022 | Hong | ...................... H04L 41/16 |
| 2024/0056367 A1* | 2/2024 | Samdanis | ........... H04L 41/5067 |

FOREIGN PATENT DOCUMENTS

| | | |
|---|---|---|
| CN | 110300006 A | 10/2019 |
| CN | 110769455 A | 2/2020 |

OTHER PUBLICATIONS

Ericsson et al, "Solution to UC and KI on how to determine the QoS profile", SA WG2 Meeting #S2-129 S2-1810227, Oct. 19, 2018, total 2 pages.

(Continued)

*Primary Examiner* — Viet D Vu

(74) *Attorney, Agent, or Firm* — HAUPTMAN HAM, LLP

(57) ABSTRACT

A communication method and apparatus. A first network device obtains first information from a second network device. The first network device obtains second information from a third network device. The first network device determines first experience information of a service of the terminal based on the first information and the second information. The first network device sends the first experience information to a fourth network device, where the first experience information is for determining a parameter that is of the service of the terminal and that is on the fourth network device.

20 Claims, 7 Drawing Sheets

(56)                    References Cited

OTHER PUBLICATIONS

3GPP TS 23.502 V16.6.0 :"3rd Generation Partnership Project; Technical Specification Group Services and System Aspects;Procedures for the 5G System (5GS); Stage 2(Release 16)",Sep. 2020,total 597 pages.

3GPP TS 23.288 V16.5.0:"3rd Generation Partnership Project;Technical Specification Group Services and System Aspects;Architecture enhancements for 5G System (5GS) to support network data analytics services(Release 16)",Sep. 2020,total 66 pages.

International Search Report issued in corresponding International Application No. PCT/CN2020/133449, dated Sep. 9, 2021, pp. 1-8.

3GPP TR 23.700-91 V2.0.0 (Nov. 2020), 3rd Generation Partnership Project; Technical Specification Group Services and System Aspects; Study on enablers for network automation for the 5G System (5GS); Phase 2(Release 17), 378 pages.

3GPP TR 23.791 V16.2.0 (Jun. 2019), 3rd Generation Partnership Project; Technical Specification Group Services and System Aspects; Study of Enablers for Network Automation for 5G(Release 16), 124 pages.

Extended European Search Report issued in corresponding European Application No. 20963909.5, dated Nov. 24, 2023, pp. 1-12.

\* cited by examiner

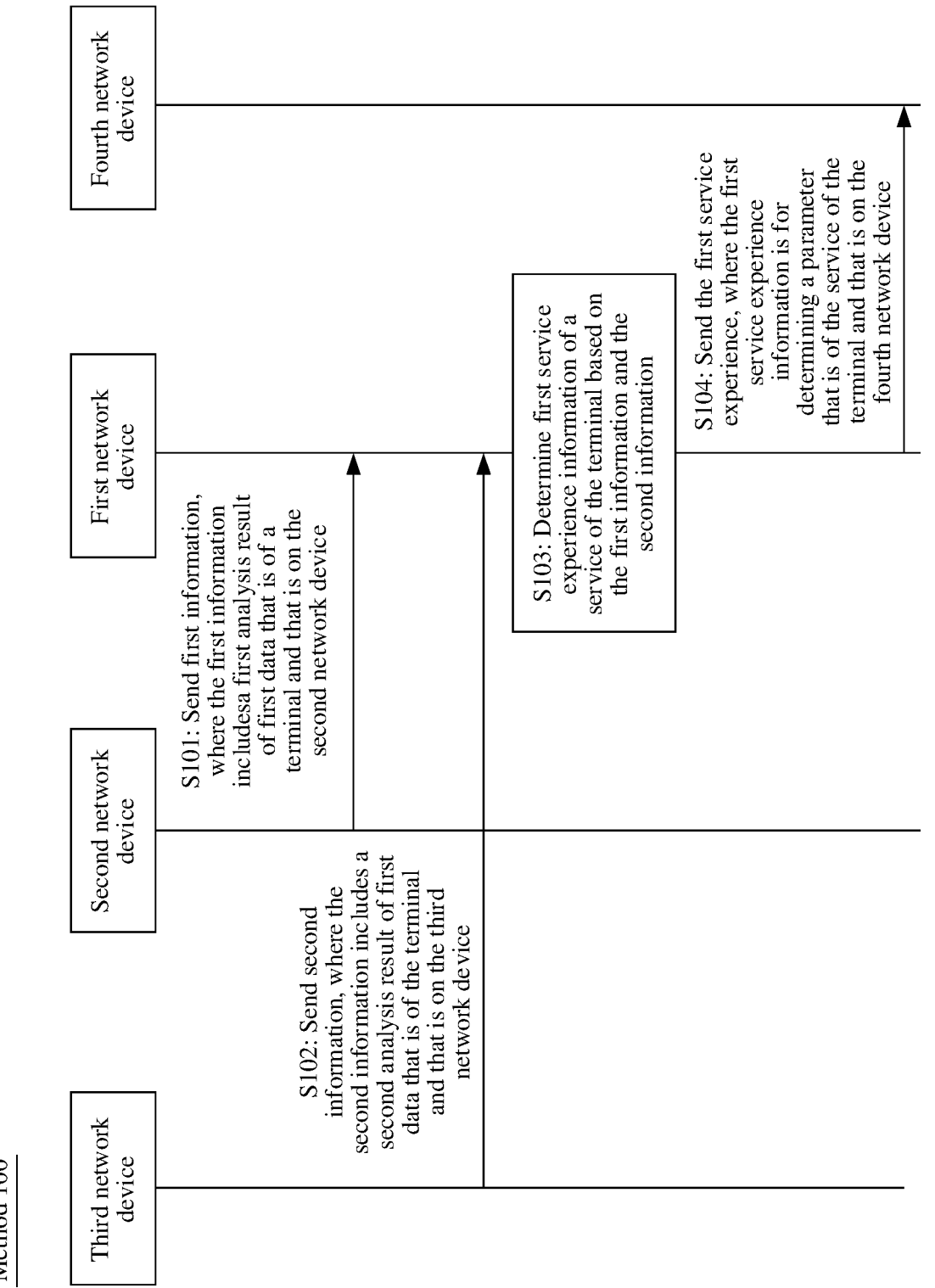

Method 100

Third network device

Second network device

First network device

Fourth network device

S101: Send first information, where the first information includesa first analysis result of first data that is of a terminal and that is on the second network device S102: Send second information, where the second information includes a second analysis result of first data that is of the terminal and that is on the third network device S103: Determine first service experience information of a service of the terminal based on the first information and the second information S104: Send the first service experience, where the first service experience information is for determining a parameter that is of the service of the terminal and that is on the fourth network device

FIG. 3

Method 200

100

200

300

400

COMMUNICATION METHOD AND APPARATUS FOR IMPROVING ACCURACY OF ADJUSTING AN APPLICATION LAYER PARAMETER BY A SERVICE PROVIDER

CROSS-REFERENCE TO RELATED APPLICATIONS

This is a continuation of International Patent Application No. PCT/CN2020/133449, filed on Dec. 2, 2020, the disclosure of which is hereby incorporated by reference in its entirety.

BACKGROUND

In a process in which a terminal performs a service, data in three domains, namely, a radio access network (RAN), a core network (CN), and a service provider (for example, an application function (AF) network element) jointly affects service experience. In a current technology, when the service experience cannot be met, the radio access network attempts to open some air interface information (for example, an available rate of a terminal air interface and a buffer status of a terminal air interface) to the service provider, to assist the service provider in adjusting an application layer parameter (for example, a congestion window).

However, in addition to some air interface information of the access network side, the network side has many parameters that affect the service experience. However, in the current technology, considering data privacy and security, the network cannot provide private data to the service provider. As a result, the service provider cannot accurately adjust the application layer parameters, and the service experience cannot be ensured.

SUMMARY

Embodiments described herein provide a communication method and apparatus, to improve accuracy of adjusting an application layer parameter by a service provider, and further ensure service experience.

According to a first aspect, at least one embodiment provides a communication method. The method includes: A first network device obtains first information from a second network device, where the first information includes a first analysis result of first data that is of a terminal and that is on the second network device; the first network device obtains second information from a third network device, where the second information includes a second analysis result of first data that is of the terminal and that is on the third network device; the first network device determines first service experience information of a service of the terminal based on the first information and the second information; and the first network device sends the first service experience information to a fourth network device, where the first service experience information is for determining a parameter that is of the service of the terminal and that is on the fourth network device.

According to the communication method in at least one embodiment, the first network device obtains the first information and the second information, where the first information includes the first analysis result of the first data that is of the terminal and that is on the second network device, and the second information includes the second analysis result of the first data that is of the terminal and that is on the third network device. The first network device determines the first service experience information of the service of the terminal based on the first information and the second information, and sends the first service experience information to the fourth network device, to improve accuracy of adjusting an application layer parameter by a service provider, and further ensure service experience.

In at least one embodiment, the service is a service flow, and the first data is data that is of the terminal corresponding to the service flow and that is on the second network device; or the first data is data that is of the terminal corresponding to the service flow and that is on the third network device.

In at least one embodiment, the first analysis result of the first data is an analysis result of service experience, namely, a model inference result of service experience; and the second analysis result of the first data is a model inference result of service experience.

With reference to the first aspect, in at least one embodiment, the second network device includes a core network device, and the method further includes: The first network device sends a first request to the core network device, where the first request is for requesting the first analysis result of the first data that is of the terminal and that is on the core network device, the first request includes first identification information of the terminal and at least one of the following information: an analysis identifier and identification information of a first model, and the analysis identifier and/or the identification information of the first model is for determining the first model corresponding to the first analysis result of the first data that is of the terminal and that is on the core network device.

In at least one embodiment, the analysis identifier is an Analytics ID, for example, service experience, network element load (NF load), network performance, terminal mobility (UE mobility), terminal communication (UE communication), expected terminal behavior (expected UE behavior), and terminal abnormal behavior (UE abnormal behavior).

In at least one embodiment, the identification information of the model is an Internet protocol (IP) address, a uniform resource locator (URL), or a fully qualified domain name (FQDN).

With reference to the first aspect and at least one embodiment of the first aspect, the third network device includes an access network device, and the method further includes: The first network device sends a second request to the access network device, where the second request is for requesting the second analysis result of the first data that is of the terminal and that is on the access network device, the second request includes second identification information of the terminal and at least one of the following information: the analysis identifier and identification information of a second model, and the analysis identifier and/or the identification information of the second model is for determining the second model corresponding to the second analysis result of the first data that is of the terminal and that is on the access network device.

With reference to the first aspect and at least one embodiment of the first aspect, the method further includes: The first network device obtains third information from the fourth network device, where the third information includes a third analysis result of first data that is of the terminal and that is on the fourth network device.

With reference to the first aspect, in at least one embodiment of the first aspect, the fourth network device includes an application function device, and the method further includes: The first network device sends a third request to the application function device, where the third request is for requesting the third analysis result of the first data that is of the terminal and that is on the application function device, the third request includes a third identifier of the terminal and at least one of the following information: the analysis identifier and identification information of a third model, and the analysis identifier and/or the identification information of the third model is for determining the third model corresponding to the third analysis result of the first data that is of the terminal and that is on the application function device.

With reference to the first aspect and at least one embodiment of the first aspect, the first information further includes first association information, where the first association information is for associating the second information with the first information; and/or the second information further includes the first association information.

In at least one embodiment, the first association information is association information between a RAN and an AMF. The association information between the RAN and the AMF is, for example, an identifier of a RAN UE NGAP ID, a globally unique identifier of the RAN, namely, a global RAN Node ID, and a timestamp that exists in response to local inference data on the core network side being generated, namely, a Timestamp.

With reference to the first aspect and at least one embodiment of the first aspect, the first information further includes second association information, and the second association information is for associating the first information with the third information; and/or the third information further includes the second association information.

In at least one embodiment, the second association information is association information between a UPF and an AF. The association information between the UPF and the AF is, for example, an IP quintuple (namely, a source IP address, a destination IP address, a source port number, a destination port number, and a protocol number), or a Timestamp that exists in response to local inference data on the UPF on the core network side being generated.

With reference to the first aspect and at least one embodiment of the first aspect, the first information further includes second data that is of the terminal and that is on the second network device, the second information further includes second data that is of the terminal and that is on the third network device, and the method further includes: The first network device obtains a fourth analysis result based on the second data that is of the terminal and that is on the second network device and the second data that is of the terminal and that is on the third network device. That the first network device determines first service experience information of a service of the terminal based on the first information and the second information includes: The first network device determines the first service experience information of the service of the terminal based on the first information, the second information, and the fourth analysis result.

With reference to the first aspect, and at least one embodiment of the first aspect, the third information further includes second data that is of the terminal and that is on the fourth network device. That the first network device obtains a fourth analysis result based on the second data that is of the terminal and that is on the second network device and the second data that is of the terminal and that is on the third network device includes: The first network device obtains the fourth analysis result based on the second data that is of the terminal and that is on the second network device, the second data that is of the terminal and that is on the third network device, and the second data that is of the terminal and that is on the fourth network device. That the first network device determines the first service experience information of the service of the terminal based on the first information, the second information, and the fourth analysis result includes: The first network device determines the first service experience information of the service of the terminal based on the first information, the second information, the third information, and the fourth analysis result.

With reference to the first aspect and at least one embodiment of the first aspect, the first network device determines first service experience information of a service of the terminal based on the first information and the second information includes: The first network device determines the first service experience information based on the first information, the second information, and second service experience information of a service requirement.

With reference to the first aspect, and at least one embodiment of the first aspect, the first information further includes second data that is of the terminal and that is on the second network device, the second information further includes second data that is of the terminal and that is on the third network device, and the method further includes: The first network device obtains a fourth analysis result based on the second data that is of the terminal and that is on the second network device and the second data that is of the terminal and that is on the third network device. That the first network device determines the first service experience information of the service of the terminal based on the first information, the second information, and second service experience information of a service requirement includes: The first network device determines the first service experience information of the service of the terminal based on the first information, the second information, the fourth analysis result, and the second service experience information of the service requirement.

With reference to the first aspect, and at least one embodiment, the third information further includes second data that is of the terminal and that is on the fourth network device. That the first network device obtains a fourth analysis result based on the second data that is of the terminal and that is on the second network device and the second data that is of the terminal and that is on the third network device includes: The first network device obtains the fourth analysis result based on the second data that is of the terminal and that is on the second network device, the second data that is of the terminal and that is on the third network device, and the second data that is of the terminal and that is on the fourth network device.

That the first network device determines the first service experience information of the service of the terminal based on the first information, the second information, the fourth analysis result, and the second service experience information of the service requirement includes: The first network device determines the first service experience information of the service of the terminal based on the first information, the second information, the third information, the fourth analysis result, and the second service experience information of the service requirement.

With reference to the first aspect and at least one embodiment, the first data that is of the terminal and that is on the second network device includes private data corresponding to the terminal.

With reference to the first aspect and at least one embodiment, the first data that is of the terminal and that is on the third network device includes private data corresponding to the terminal.

With reference to the first aspect and at least one embodiment, the first data that is of the terminal and that is on the fourth network device includes private data corresponding to the terminal.

With reference to the first aspect and at least one embodiment, the second data that is of the terminal and that is on the second network device includes public data corresponding to the terminal.

With reference to the first aspect and at least one embodiment, the second data that is of the terminal and that is on the third network device includes public data corresponding to the terminal.

With reference to the first aspect and at least one embodiment, the second data that is of the terminal and that is on the fourth network device includes public data corresponding to the terminal.

With reference to the first aspect and at least one embodiment, the first network device includes a data analysis device or a policy control device.

With reference to the first aspect and at least one embodiment, the first model, the second model, or the third model is a submodel obtained through distributed training.

According to a second aspect, a communication method is provided. The method includes: A second network device determines first information, where the first information includes a first analysis result of first data that is of a terminal and that is on the second network device; and the second network device sends the first information to a first network device.

With reference to the second aspect, and at least one embodiment, that the second network device sends the first information to a first network device includes: The second network device receives a first request from the first network device, where the first request is for requesting the first analysis result of the first data that is of the terminal and that is on the second network device, the first request includes first identification information of the terminal and at least one of the following information: an analysis identifier, identification information of a first model, and model information of the first model, and the analysis identifier and/or the identification information of the first model is for determining the first model; and the second network device sends a first response to the first network device, where the first response includes the first information.

With reference to the second aspect and at least one embodiment, the first information further includes second data that is of the terminal and that is on the second network device.

With reference to the second aspect and at least one embodiment, the first information further includes first association information, where the first association information is for associating the second information with the first information, and the second information includes a second analysis result of first data that is of the terminal and that is on a third network device; and/or the second information further includes the first association information.

With reference to the second aspect and at least one embodiment, the first information further includes second association information, and the second association information is for associating the first information with third information, where the third information includes a third analysis result of first data that is of the terminal and that is on a fourth network device; and/or the third information further includes the second association information.

With reference to the second aspect and at least one embodiment, the first data that is of the terminal and that is on the second network device includes private data corresponding to the terminal.

With reference to the second aspect and at least one embodiment, the first data that is of the terminal and that is on the third network device includes private data corresponding to the terminal.

With reference to the second aspect and at least one embodiment, the first data that is of the terminal and that is on the fourth network device includes private data corresponding to the terminal.

With reference to the second aspect and at least one embodiment, the second data that is of the terminal and that is on the second network device includes public data corresponding to the terminal.

With reference to the second aspect and at least one embodiment, the first network device includes a data analysis device or a policy control device.

With reference to the second aspect and at least one embodiment, the second network device includes a core network device.

With reference to the second aspect and at least one embodiment, the third network device includes an access network device.

With reference to the second aspect and at least one embodiment, the fourth network device includes an application function device.

With reference to the second aspect and at least one embodiment, the first model is a submodel obtained through distributed training.

According to a third aspect, a communication method is provided. The method includes: A third network device determines second information, where the second information includes a second analysis result of first data that is of a terminal and that is on the third network device; and the third network device sends the second information to a first network device.

With reference to the third aspect, and at least one embodiment, the third network device sends the second information to a first network device includes: The third network device receives a second request from the first network device, where the second request is for requesting the second analysis result of the first data that is of the terminal and that is on the third network device, the second request includes second identification information of the terminal and at least one of the following information: an analysis identifier, identification information of the second model, and model information of the second model, and the analysis identifier and/or the identification information of the second model is for determining the second model. The third network device sends a second response to the first network device, where the second response includes the second information.

With reference to the third aspect and at least one embodiment, the second information further includes second data that is of the terminal and that is on the third network device.

With reference to the third aspect and at least one embodiment, the second information further includes first association information, the first association information is for associating the second information with first information, and the first information includes a first analysis result of first data that is of the terminal and that is on a second network device.

With reference to the third aspect and at least one embodiment, the first data that is of the terminal and that is on the second network device includes private data corresponding to the terminal.

With reference to the third aspect and at least one embodiment, the first data that is of the terminal and that is on the third network device includes private data corresponding to the terminal.

With reference to the third aspect and at least one embodiment, the second data that is of the terminal and that is on the third network device includes public data corresponding to the terminal.

With reference to the third aspect and at least one embodiment, the first network device includes a data analysis device or a policy control device.

With reference to the third aspect and at least one embodiment, the second network device includes a core network device.

With reference to the third aspect and at least one embodiment, the third network device includes an access network device.

With reference to the third aspect and at least one embodiment, the second model is a submodel obtained through distributed training.

According to a fourth aspect, a communication method is provided. The method includes: A fourth network device receives first service experience information sent by a first network device, where the first service experience information is for determining a parameter that is of a service of a terminal and that is on the fourth network device, the first service experience information is determined based on first information and second information, the first information includes a first analysis result of first data that is of the terminal and that is on a second network device, and the second information includes a second analysis result of first data that is of the terminal and that is on a third network device; and the fourth network device determines, based on the first service experience information, the parameter that is of the service of the terminal and that is on the fourth network device.

With reference to the fourth aspect and at least one embodiment, the first information further includes second data that is of the terminal and that is on the second network device, the second information further includes second data that is of the terminal and that is on the third network device, and that the first service experience information is determined based on first information and second information includes: the first service experience information of the service of the terminal is determined based on the first information, the second information, and a fourth analysis result, where the fourth analysis result is determined based on second data that is of the terminal and that is on the second network device and second data that is of the terminal and that is on the third network device.

With reference to the fourth aspect and at least one embodiment, the method further includes: The fourth network device determines third information, where the third information includes a third analysis result of first data that is of the terminal and that is on the fourth network device; and the fourth network device sends the third information to the first network device.

With reference to the fourth aspect and at least one embodiment, the fourth network device sends the third information to the first network device includes: The fourth network device receives a third request from a first network device, where the third request is for requesting the third analysis result of the first data that is of the terminal and that is on the fourth network device, the third request includes third identification information of the terminal and at least one of the following information: an analysis identifier, identification information of the third model, and model information of the third model, and the analysis identifier and/or the identification information of the third model is for determining the third model; and the fourth network device sends a third response to the first network device, where the third response includes the third information.

With reference to the fourth aspect and at least one embodiment, the third information further includes second data that is of the terminal and that is on the fourth network device, and that the first service experience information of the service of the terminal is determined based on the first information, the second information, and a fourth analysis result includes: the first service experience information is determined based on the first information, the second information, the third information, and the fourth analysis result. That the fourth analysis result is determined based on second data that is of the terminal and that is on the second network device and second data that is of the terminal and that is on the third network device includes: the fourth analysis result is determined based on the second data that is of the terminal and that is on the second network device, the second data that is of the terminal and that is on the third network device, and the second data that is of the terminal and that is on the fourth network device.

With reference to the fourth aspect and at least one embodiment, that the first service experience information is determined based on first information and second information includes: the first service experience information is determined based on the first information, the second information, and second service experience information of a service requirement.

With reference to the fourth aspect and at least one embodiment, the third information further includes the second data that is of the terminal and that is on the third network device.

With reference to the fourth aspect and at least one embodiment, the third information further includes second association information, the second association information is for associating the first information with the third information, and the first information includes the first analysis result of the first data that is of the terminal and that is on the second network device.

With reference to the fourth aspect and at least one embodiment, the first data that is of the terminal and that is on the second network device includes private data corresponding to the terminal.

With reference to the fourth aspect and at least one embodiment, the first data that is of the terminal and that is on the third network device includes private data corresponding to the terminal.

With reference to the fourth aspect and at least one embodiment, the first data that is of the terminal and that is on the fourth network device includes private data corresponding to the terminal.

With reference to the fourth aspect and at least one embodiment, the second data that is of the terminal and that is on the second network device includes public data corresponding to the terminal.

With reference to the fourth aspect and at least one embodiment, the second data that is of the terminal and that is on the third network device includes public data corresponding to the terminal.

With reference to the fourth aspect and at least one embodiment, the second data that is of the terminal and that is on the fourth network device includes public data corresponding to the terminal.

With reference to the fourth aspect and at least one embodiment, the first network device includes a data analysis device or a policy control device.

With reference to the fourth aspect and at least one embodiment, the second network device includes a core network device.

With reference to the fourth aspect and at least one embodiment, the third network device includes an access network device.

With reference to the fourth aspect and at least one embodiment, the fourth network device includes an application function device.

With reference to the fourth aspect and at least one embodiment, the third model is a submodel obtained through distributed training.

According to a fifth aspect, a communication apparatus is provided. The apparatus is configured to perform an operation of a communication device in the first aspect. Specifically, the communication apparatus includes a corresponding component (means) configured to perform the steps or functions described in the first aspect, and the component is the first network device in the first aspect. The steps or the functions are implemented by using software, hardware, or a combination of hardware and software.

According to a sixth aspect, a communication apparatus is provided. The apparatus is configured to perform an operation of a communication device in the second aspect. Specifically, the apparatus includes a corresponding component (means) configured to perform the steps or functions described in the second aspect. The steps or the functions is implemented by using software, hardware, or a combination of hardware and software.

According to a seventh aspect, a communication apparatus is provided. The apparatus is configured to perform an operation of a communication device in the third aspect. Specifically, the communication apparatus includes a corresponding component (means) configured to perform the steps or functions described in the third aspect, and the component is the first network device in the third aspect. The steps or the functions is implemented by using software, hardware, or a combination of hardware and software.

According to an eighth aspect, a communication apparatus is provided. The apparatus is configured to perform an operation of a communication device in the fourth aspect. Specifically, the apparatus includes a corresponding component (means) configured to perform the steps or functions described in the fourth aspect. The steps or the functions is implemented by using software, hardware, or a combination of hardware and software.

According to a ninth aspect, a communication device is provided, including a processor and a memory. The memory is configured to store a computer program, and the processor is configured to invoke the computer program from the memory and run the computer program, so that the communication apparatus performs the communication method according to at least one embodiment of the first aspect to the fourth aspect.

There are one or more processors and one or more memories. The memory is integrated with the processor, or the memory and the processor are separately disposed.

The communication device further includes a transmitter and a receiver.

In at least one embodiment, a communication device is provided, including a transceiver, a processor, and a memory. The processor is configured to control the transceiver to send and receive a signal. The memory is configured to store a computer program. The processor is configured to invoke the computer program from the memory and run the computer program, so that the communication device performs the method according to the first aspect to the fourth aspect.

According to a tenth aspect, a system is provided, and the system includes the foregoing communication apparatus.

According to an eleventh aspect, a computer program product is provided. The computer program product includes a computer program (which is also referred to as code or instructions). In response to the computer program being run, a computer is enabled to perform the method according to at least one embodiment of the first aspect to the fourth aspect.

According to a twelfth aspect, a computer-readable medium is provided. The computer-readable medium stores a computer program (which is also referred to as code or instructions). When the computer program is run on a computer, the computer is enabled to perform the method according to at least one embodiment of the first aspect to the fourth aspect.

According to a thirteenth aspect, a chip system is provided, including a memory and a processor. The memory is configured to store a computer program. The processor is configured to invoke the computer program from the memory and run the computer program, so that a communication device on which the chip system is installed performs the method according to at least one embodiment of the first aspect to the fourth aspect.

According to a fourteenth aspect, a chip is provided. The chip includes a processor and a communication interface. The communication interface is configured to communicate with an external component or an internal component. The processor is configured to implement the method according to at least one embodiment of the first aspect to the fourth aspect.

Optionally, the chip further includes a memory. The memory stores instructions. The processor is configured to execute the instructions stored in the memory or other instructions. In response to the instructions being executed, the processor is configured to implement the method according to at least one embodiment of the first aspect to the fourth aspect. Optionally, the chip is integrated into an access network device.

According to a fifteenth aspect, a communication system is provided. The communication system includes a first network device, where the first network device is configured to perform the method according to at least one embodiment of the first aspect to the fourth aspect. The communication system further includes a second network device, where the second network device is configured to send first information to the first network device, and the first information includes a first analysis result of first data that is of a terminal and that is on the second network device.

According to the communication method and the communication apparatus in embodiments of the present invention, accuracy of adjusting an application layer parameter by a service provider is improved, to ensure service experience.

BRIEF DESCRIPTION OF DRAWINGS

FIG. 3 is a schematic flowchart of a communication method according to at least one embodiment;

DESCRIPTION OF EMBODIMENTS

The following describes technical solutions of at least one embodiment with reference to the accompanying drawings.

A wireless communication system in at least one embodiment includes but is not limited to a global system for mobile communication (GSM), a long term evolution (LTE) frequency division duplex (FDD) system, an LTE time division duplex (TDD) system, an LTE system, a long term evolution-advanced (LTE-A) system, a next-generation communication system (for example, a 6G communication system), a system integrating a plurality of access systems, or an evolved system.

A terminal device in at least one embodiment includes various access terminals, mobile devices, user terminals, or user apparatuses that have a wireless communication function. For example, the terminal device is a mobile phone, a pad, a computer with a wireless transceiver function, a virtual reality (VR) terminal device, an augmented reality (AR) terminal device, a wireless terminal in industrial control, a machine type communication (MTC) terminal, customer premise equipment (CPE), a wireless terminal in self driving, a wireless terminal in remote medical, a wireless terminal in a smart grid, a wireless terminal in transportation safety, a wireless terminal in smart city, a wireless terminal in smart home, or the like. An application scenario is not limited in at least one embodiment. In at least one embodiment, the foregoing terminal device and a chip that is disposed in the foregoing terminal device are collectively referred to as a terminal device.

By way of example, and not limitation, in at least one embodiment, the terminal device is alternatively a wearable device. The wearable device may also be referred to as a wearable intelligent device, and is a general term of a wearable device that is intelligently designed and developed for daily wear by using a wearable technology, for example, glasses, gloves, a watch, clothing, and shoes. The wearable device is a portable device that is directly worn on the body or integrated into clothes or an accessory of a user. The wearable device is not only a hardware device, but also implements a powerful function through software support, data exchange, and cloud interaction. Generalized wearable intelligent devices include full-featured and large-size devices that implements complete or partial functions without depending on smartphones, such as smart watches or smart glasses, and devices that focus on only one type of application function and works with other devices such as smartphones, such as various smart bands or smart jewelry for monitoring physical signs.

Figure 1:
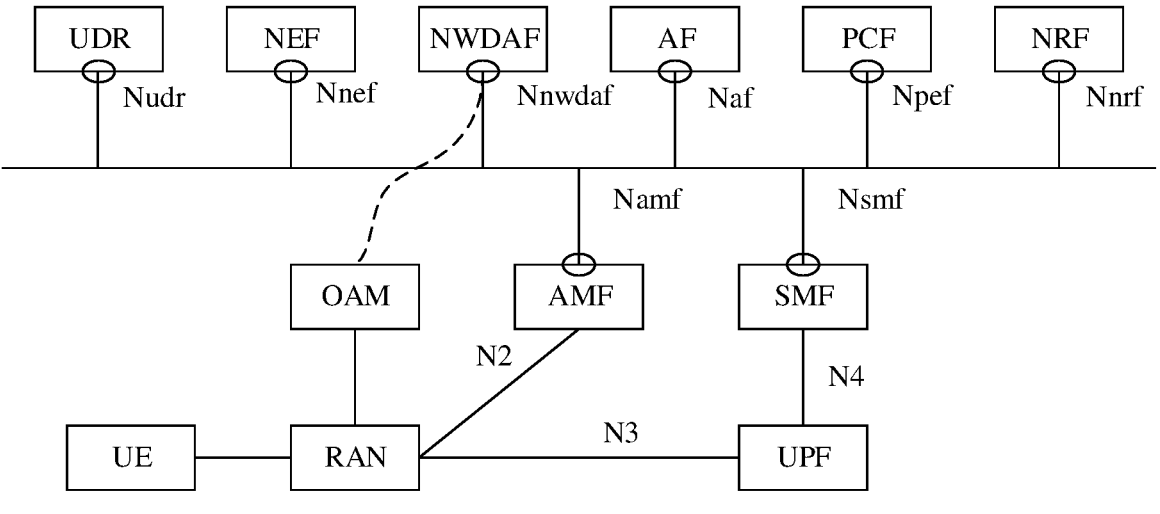
FIG. 1 is a schematic diagram of an application scenario of a method according to at least one embodiment.

FIG. 1 is a schematic diagram of a network architecture applicable to a method according to at least one embodiment. The network architecture further includes the following network elements:

1. Radio access network (RAN): An access network that implements a network access function based on a wireless communication technology is referred to as a radio access network. The radio access network manages radio resources, provide an access service for a terminal, and further complete forwarding of a control signal and user data between a terminal and a core network.

The radio access network is, for example, a base transceiver station (BTS) in a global system for mobile communication (GSM) or code division multiple access (CDMA) system, or is a base station (NB) in a wideband code division multiple access (WCDMA) system, or is an evolved NodeB (evolved NodeB, eNB or eNodeB) in an LTE system, or is a radio controller in a cloud radio access network (CRAN) scenario. Alternatively, the network device is a relay station, an access point, an in-vehicle device, a wearable device, a network device in a future 5G network, a network device in a future evolved PLMN network, or the like. This is not limited in at least one embodiment.

2. Network data analytics function network element (NWDAF) has at least one of the following functions: a data acquisition function and a data analysis function. The data acquisition function is for acquiring related data from a network element, a third-party service server, a terminal device, or a network management system. The data analysis function is for performing analysis and training based on related input data to obtain a model, performing inference based on the model to determine a data analysis result, and then providing the data analysis result to the network element, the third-party service server, the terminal device, or the network management system. The analysis result assists the network in selecting a quality of service parameter of a service, assist the network in performing traffic routing, or assist the network in selecting a background traffic transmission policy. At least one embodiment relates to the data acquisition function and the model training function of the NWDAF.

In at least one embodiment, the NWDAF is an independent network element, or is integrated with another core network element. For example, the NWDAF network element is integrated with an access and mobility management function (AMF) network element or integrated with a session management function (SMF) network element.

Typical application scenarios of the NWDAF include: terminal parameter customization or optimization, to be specific, the NWDAF acquires information about user connection management, mobility management, session management, and accessed services, and uses a reliability analysis and prediction model to evaluate and analyze different types of users, construct user profiles, determine user movement tracks and service usage habits, and predict user behaviors, and a 5G network optimizes user mobility management parameters and radio resource management parameters based on analysis and prediction data; service (path) optimization, to be specific, the NWDAF acquires information such as network performance, service load in a specific area, and user service experience, and uses a reliable network performance analysis and prediction model to evaluate and analyze different types of services, construct service profiles, determine internal associations between service quality of experience (QoE), service experience, service path, 5G quality of service (QoS) parameters, and the like, optimize service paths, service routes, and 5G edge computing, and determine 5G QoS parameters corresponding to services; and service parameter optimization by an AF. For example, the Internet of vehicles is an important technology of the 5G network. In an automatic driving scenario of the Internet of Vehicles, prediction of network performance (for example, QoS information and service load) of a base station that a vehicle is to pass through plays an important role in improving quality of service of the Internet of Vehicles. For example, an Internet of Vehicles server determines, based on prediction information of network performance, whether to continue to maintain an unmanned driving mode. The NWDAF acquires information such as network performance and service load in a specific area, and uses the reliable network performance analysis and prediction model to acquire statistics on and predict network performance, helping the AF optimize parameters.

3. AMF network element is mainly configured for mobility management, access management, and the like, and is configured to implement another function other than session management in a mobility management entity (MME) function, for example, terminal mobility management, terminal registration and deregistration, terminal session access, allowed slice access selection of the terminal, and lawful interception or access authorization. In at least one embodiment, the AMF network element is configured to implement functions of an access and mobility management network element.

4. SMF network element is configured to manage a session, allocate and manage an IP address of a terminal device, select and manage a user plane function, perform policy control, terminate a charging function interface, notify downlink data, or the like. In at least one embodiment, the SMF network element is configured to implement functions of a session management network element.

5. Policy control network element (PCF) is configured to provide guidance on a unified policy framework for network behavior, and provide a service policy, charging policy information, and the like for a control plane function network element (for example, an AMF network element or an SMF network element).

6. An application function network element (AF) is configured to provide a service, or perform data routing affected by an application, access a network exposure function network element, exchange service data with a PCF network element to perform policy control, or the like.

7. Network exposure function network element (NEF) is configured to securely expose, to the outside, service and capability information (for example, a terminal location and a network congestion status) provided by a 3GPP network function network element.

8. User plane function network element (UPF) is configured to perform packet routing and forwarding, or QoS parameter processing of user plane data, or the like. User data is accessed to a data network (DN) through this network element. In at least one embodiment, the UPF is configured to implement functions of a user plane network element.

9. Charging function network element (CHF) is responsible for generating a charging data record (CDR), also known as bills, and sending the record to a charging gateway function (CGF). The CGF finally creates a CDR file and forwards the file to a relevant processing device in charging domain. In addition, as a quota control node of online charging, the CHF performs online charging rate processing for various services of users, and completes real-time settlement of user fees through an ABMF.

10. Unified data repository network element (UDR) is configured to store subscription data, service policy data, unstructured data, and the like.

11. Operation, administration and maintenance (OAM): Main functions of OAM include network resource (for example, radio access network resources, core network element resources, and transmission network resources) management, fault management, and performance management. OAM effectively improves network management and maintenance capabilities of Ethernet and ensure stable operation of the network.

In this network architecture, an N2 interface is an interface between the RAN and the AMF network element, and is used to send a radio parameter, NAS signaling, and the like. An N3 interface is an interface between the RAN and the UPF network element, and is used to transmit user plane data and the like. An N4 interface is an interface between the SMF network element and the UPF network element, and is used to transmit information such as a service policy, tunnel identification information of an N3 connection, data buffer indication information, and a downlink data notification message.

The foregoing network architecture applied to embodiments described herein is merely an example of a network architecture described from the perspective of a conventional point-to-point architecture and a service architecture, and a network architecture applicable to embodiments described herein is not limited thereto. Any network architecture that implements functions of the foregoing network elements is applicable to embodiments described herein.

Names of interfaces between network elements in FIG. 1 are merely examples, and the interfaces have other names in a specific implementation. This is not specifically limited in embodiments described herein. In addition, names of messages (or signaling) transmitted between the foregoing network elements are merely examples, and do not constitute any limitation on functions of the messages.

As the data volume increases, training a model on a single server takes a long time. Therefore, a distributed machine learning system completes model training through a plurality of machines, shortening the training time. Such machines is serially or parallelly combined based on performance of the machines, and each of the machines completes a respective part of responsibility. By way of example, and not limitation, in at least one embodiment, a federated learning model in a distributed machine learning system is used as an example for description.

In order not to disclose privacy or affect data compliance, and to protect data privacy and security, a model training method is used to extract a feature of private data, and establish a virtual common model, so that the feature of the data is obtained through the model without obtaining original data on the network side. Federated learning (FL) is a feasible solution to meet privacy protection and data security requirements. Currently, federated learning prevents data from being transmitted locally. A virtual common model is established through parameter exchange in an encryption mechanism without violating data privacy laws and regulations. The virtual model is like an optimal model that is built by aggregating data. However, in response to the virtual model being established, the data is not moved, privacy is not disclosed, and data compliance is not affected. In this way, created models serve only local targets in respective regions.

Federated learning is classified into vertical federated learning, horizontal federated learning, and federated transfer learning. Vertical federated learning means that in response to users (or samples) of two datasets overlapping more but user features overlapping less, the datasets are split vertically (namely, in a feature dimension), and a part of data, of the same users but different user features, in the two datasets is extracted for training. Horizontal federated learning means that in response to users of two datasets overlapping less but user features overlapping more, the datasets are split horizontally (namely, in a user or sample dimension), and data of different users of the two datasets is extracted for training respectively. Federated transfer learning means that in response to users and user features of two datasets both overlapping less, a model obtained by training one of the datasets is applied to the other dataset for training. The present invention relates only to vertical federated learning and horizontal federated learning.

Figure 2:
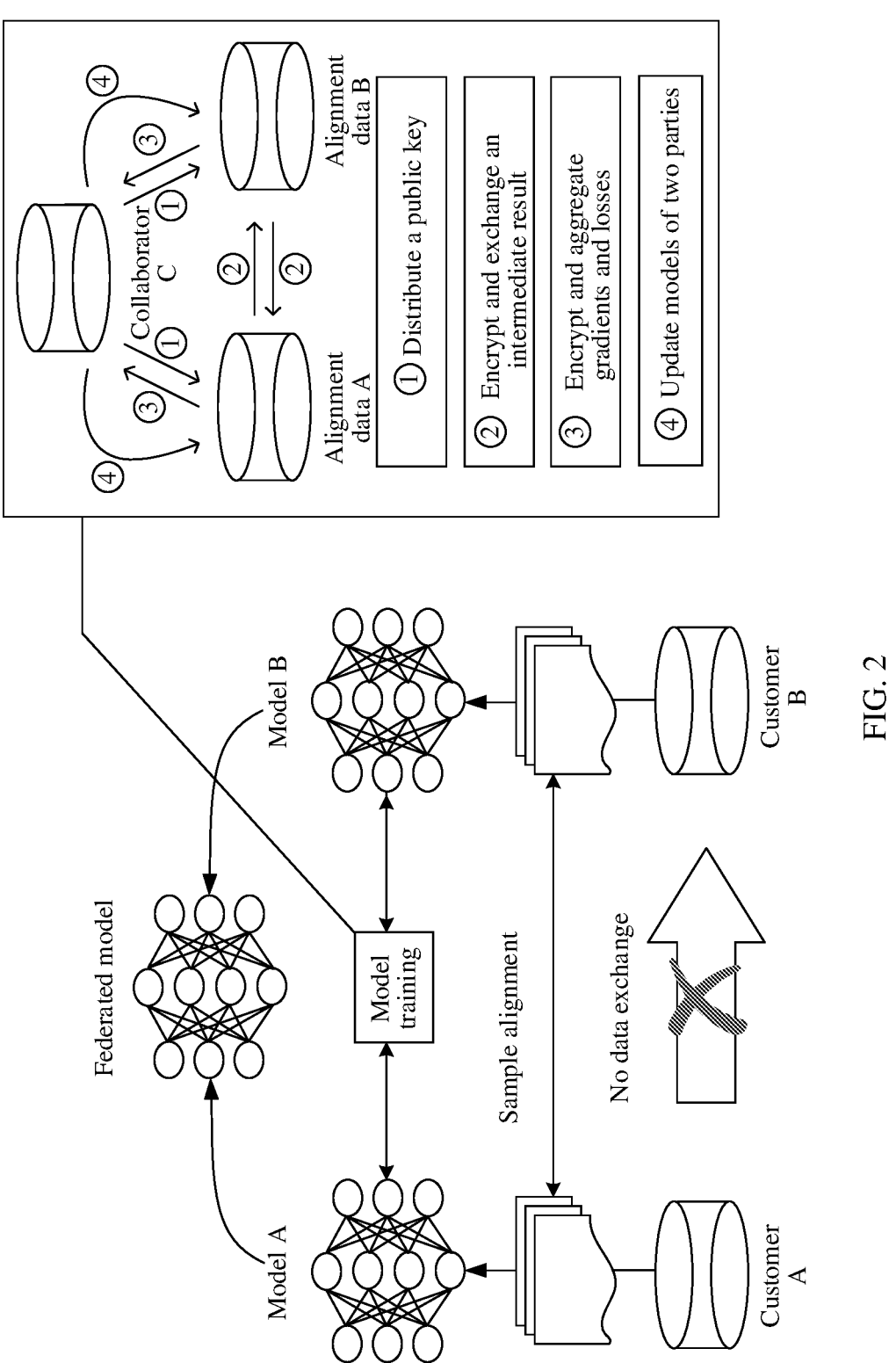
FIG. 2 is a schematic diagram of a framework of a federated learning system in distributed training according to at least one embodiment.

FIG. 2 is a schematic diagram of a federated learning system framework. The system architecture includes two parts: encrypted sample alignment and encrypted model training. After a common user group is determined, a machine learning model is trained by using the data. To ensure data confidentiality in a training process, encryption training is to be performed through a third-party collaborator C. Using a linear regression model as an example, the training process is divided into the following four steps:

Step 1: The collaborator C distributes a public key to A and B, to encrypt data that is to be exchanged in the training process.

Step 2: A and B exchange, in an encrypted form, an intermediate result for calculating a gradient. A detailed process is as follows:

Client A has a dataset $\{x_i^A\} i \in D_A$, and client B has a dataset $\{x_i^B, y_i\} \in D_B$, where is $y_i$ label data. A model to be trained is as follows:

$$h(x_i) = \theta_A x_i^A + \theta_B x_i^B \qquad \text{Formula 1.}$$

A target function for linear regression is: min L, where L is a loss function as follows:

$$L = \sum_i \left\| \theta_A x_i^A + \theta_B x_i^B - y_i \right\|^2 + \frac{\lambda}{2} \left( \|\theta_A\|^2 + \|\theta_B\|^2 \right). \qquad \text{Formula 2}$$

Because original data $D_A$ and $D_B$ on A and B cannot be aggregated together, a conventional centralized training method cannot be used. A vertical federated training method is as follows:

Let $\mu_i^A = \theta_A x_i^A$ and $\mu_i^B = \theta_B x_i^B$, L is then transformed as follows:

$$L = \sum_i \left\| \mu_i^A + \mu_i^B - y_i \right\|^2 + \frac{\lambda}{2} \left( \|\theta_A\|^2 + \|\theta_B\|^2 \right). \qquad \text{Formula 3}$$

Let $$L_A = \sum_i \left( (\mu_i^A)^2 \right) + \frac{\lambda}{2} \|\theta_A\|^2, \qquad \text{Formula 4}$$

$$L_B = \sum_i \left( (\mu_i^B - y_i)^2 \right) + \frac{\lambda}{2} \|\theta_B\|^2, \text{ and}$$

$$L_{AB} = 2 \sum_i \mu_i^A (\mu_i^B - y_i), \text{ then } L = L_A + L_B + L_{AB}.$$

Let $d_i = \mu_i^A + \mu_i^B - y_i$, gradients of L with respect to $\theta_A$ and $\theta_B$ are as follows:

$$\frac{\partial L}{\partial \theta_A} = \sum_i d_i x_i^A + \lambda \theta_A; \text{ and} \qquad \text{Formula 5}$$

$$\frac{\partial L}{\partial \theta_B} = \sum_i d_i x_i^B + \lambda \theta_B. \qquad \text{Formula 6}$$

Correspondingly, model parameters are updated as follows:

$$\theta_A := \theta_A + \alpha \frac{\partial L}{\partial \theta_A}; \text{ and} \qquad \text{Formula 7}$$

$$\theta_B := \theta_B + \alpha \frac{\partial L}{\partial \theta_B}. \qquad \text{Formula 8}$$

A training process based on vertical federated learning is as follows:

(1) Client A and Client B initialize model parameters $\theta_A$ and $\theta_B$ respectively.

(2) Client A calculates $\mu_i^A$ and $L_A$ based on $\theta_A$ and local data $x_i^A$, and sends the calculation result to Client B.

(3) Client B calculates $\mu_i^B$ based on $\theta_B$ and local data $x_i^B$, further calculates $d_i$, $L_{AB}$, and $L_B$ based on $\mu_i^A$, $\mu_i^B$, and $y_i$, and finally obtains L through calculation based on $L_A$, $L_{AB}$, and $L_B$. Client B sends $d_i$ to Client A.

Step 3: A and B perform calculation based on an encrypted gradient value respectively; B calculates a loss based on the label data of B and aggregates the results to C; and C calculates a total gradient based on the aggregated results and decrypts the total gradient.

Step 4: C respectively transmits the decrypted gradient back to A and B, and A and B update respective model parameters based on the gradient.

The foregoing steps are iterated until a model training end condition is met. For example, a quantity of iterations reaches a specific threshold (for example, 10000), and the loss L is less than a specific threshold (for example, 0.00001). In this way, the entire training process is completed.

After the training ends, in an inference phase, A and B calculate local inference results $\theta_A x_i^A$ and $\theta_B x_i^B$ respectively based on the trained model parameters $\theta_A$ and $\theta_B$. In other words, the model inference results of the service are obtained based on the trained model parameters and private data of the service.

In a sample alignment and model training process, data of A and B is stored locally, and data exchange during pre-training does not cause data privacy leakage.

A vertical federated learning model is a training model for implementing the communication method in at least one embodiment, and shall not constitute any limitation on embodiments described herein. At least one embodiment does not exclude that a common model is established by using another distributed training model, another model defined in the future, or another method to jointly use respective data without violating a data privacy regulation. A method that implements the foregoing same or similar functions falls within the protection scope of embodiments described herein.

Currently, a 5G network lacks a service experience evaluation mechanism. In a current technology, a fixed QoS parameter is used to ensure a rich and variable 5G service. As a result, a service experience requirement cannot accurately match a network resource. Currently, a base station provides information such as an available rate of a UE air interface and a buffer status of the UE air interface, and send the information to a TCP transmitter through transmission control protocol acknowledge (TCP ACK) extension in associated mode. The TCP transmitter or a TCP receiver adjusts an initial congestion control window or a congestion window of a congestion avoidance interface of a service based on a radio status, to ensure service experience. However, in order to improve service experience, the information provided by the current network is not enough to enable an application layer to optimize the QoS parameters. To be specific, in addition to the air interface information of the access network side, the network side has many parameters that affect the service experience. Considering protection of data privacy, the network side cannot provide the private data. Therefore, in the current technology, a service provider cannot accurately adjust application layer parameters, and service experience cannot be ensured.

Therefore, to resolve the foregoing problem, at least one embodiment provides a communication method, to enable a service provider to update a local parameter based on a model inference result of service experience of the network side or a service requirement.

Specifically, in at least one embodiment, service experience or service flow experience model parameters is first obtained based on the foregoing vertical federated training model. An NWDAF or a PCF (namely, an example of a first network device) obtains a model inference result (namely, an example of an analysis result) of a terminal for private data (namely, an example of first data) of the service or the service flow in each domain. For example, the first network device obtains a model inference result of service experience (namely, an example of a first analysis result) of the terminal for the service or the service flow in a CN domain (namely, an example of a second network device), a model inference result of service experience (namely, an example of a second analysis result) in a RAN domain (namely, an example of a third network device), or a model inference result of service experience (namely, an example of a third analysis result) in an AF domain (namely, an example of a fourth network device). The PCF network element then determines a value relationship between the model inference result of service experience and a service experience requirement or a service flow experience requirement (namely, an example of second service experience information). In response to the model inference result of service experience of the terminal not meeting the service experience requirement or the service flow experience requirement, the PCF network element attempts to calculate a new QoS parameter. In response to the PCF not obtaining a suitable QoS parameter through calculation, the network side has been adjusted to a limit. The first network device then sends a model inference result of service experience of the network side or a service flow requirement (namely, an example of first service experience information) to an application function device (namely, an example of a fourth network device). The fourth network device determines a local application layer QoS parameter based on the model inference result of service experience or the service flow requirement. For ease of understanding, the following describes in detail a process of determining a QoS parameter.

By way of example, and not limitation, a multi-criteria decision-making (MCDM) algorithm method is used as an example for description. A process in which the fourth network device determines the local application layer QoS parameter based on the model inference result of service experience or the service flow requirement is a process of solving the following equation set based on the MCDM algorithm:

$$
\begin{cases}
\text{model inference result of service experience} & \text{Formula 9} \\
\quad \text{or service flow requirement:} \\
\qquad h(x_i^D) = \theta_D x_i^D \\
\text{energy consumption requirement: } g(x_i^D) \le C_1^D \\
\qquad \text{cost requirement: } f(x_i^D) \le C_2^A
\end{cases}
$$

The fourth network device solves the foregoing equation set to determine the QoS parameter corresponding to $x_i^D$. In this way, objectives such as "highest possible" service experience, "lowest possible" energy consumption, and "lowest possible" cost on the fourth network device are met. This is a typical multi-objective optimization problem. Different from single-objective optimization with only one optimal solution, multi-objective optimization generally has a plurality of solutions that are referred to as Pareto optimal solutions. In principle, a larger quantity of objectives indicates a smaller quantity of optimal solutions.

In the following process of describing embodiments with reference to the accompanying drawings, the figures are merely for ease of understanding, and shall not constitute any limitation on embodiments described herein. In addition, NWDAF shown in the FIG. corresponds to a data analysis function network element, CN corresponds to a core network, AMF corresponds to an access and mobility management network element, SMF corresponds to a session management network element, PCF corresponds to a policy control network element, AF represents an application function network element, and RAN represents a radio access network element or a radio access network device. Names of the network elements are defined only for distinguishing between different functions, and shall not constitute any limitation on embodiments described herein. At least one embodiment does not exclude a possibility of defining another network element to implement a same or similar function.

FIG. 3 is a schematic flowchart of a communication method 100 according to at least one embodiment. By way of example, and not limitation, in FIG. 3, a first network device is a data analysis device or a policy control device, a second network device is a core network device, a third network device is a radio access network device, and a fourth network device is an application function device.

S101: The first network device obtains first information sent by the second network device, where the first information includes a first analysis result of first data that is of a terminal and that is on the second network device.

The first information is an analysis result of service experience data that is of the terminal and that is in a core network domain, namely, an inference result corresponding to a service experience model, and the first data includes private data corresponding to the terminal in the core network domain.

S102: The first network device obtains second information sent by the third network device, where the second information includes a second analysis result of first data that is of the terminal and that is on the third network device.

The second information is an analysis result of service experience data that is of the terminal and that is in a radio access network domain, namely, an inference result corresponding to the service experience model, and the first data includes private data corresponding to the terminal in the radio access network domain.

S103: The first network device determines first service experience information of a service of the terminal based on the first information and the second information.

In an example, in response to the first network device being a data analysis device, the data analysis device determines the first service experience information based on the analysis result of the service experience data that is of the terminal and that is in the core network domain and the analysis result of the service experience data that is of the terminal and that is in the radio access network domain. For example, the first service experience information is a maximum service experience requirement that is met by the network side, or the first service experience information is a minimum service experience requirement that is to be met by the fourth network device.

S104: The first network device sends the first service experience information to the fourth network device, where the first service experience information is for determining a parameter that is of the service of the terminal and that is on the fourth network device.

As described above, the fourth network device calculates and updates a local application layer parameter by using the multi-criteria decision-making algorithm and based on the first service experience information.

According to the communication method provided in embodiments described herein, the first network device obtains the analysis results of the service experience data of the terminal on the second network device and the third network device for the service and sends a data analysis result of a service flow to an application function network element. The application function network element performs parameter adjustment based on the model inference result in each domain, to improve accuracy of adjusting an application layer parameter by the application function network element, and further improve service experience of the service of the terminal.

Figure 4:
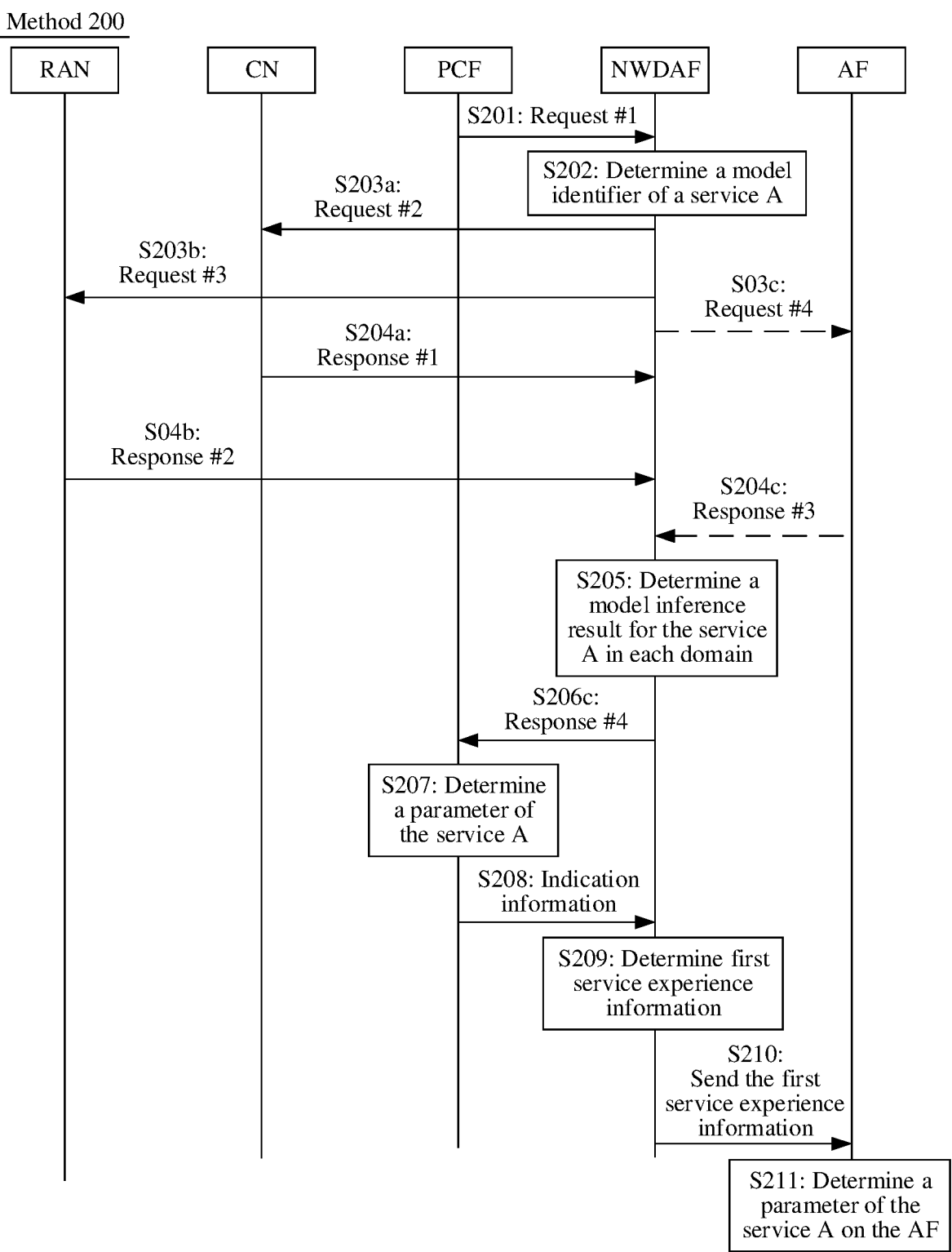
FIG. 4 is a schematic flowchart of a communication method according to at least one embodiment.

FIG. 4 is a schematic flowchart of a communication method 200 according to at least one embodiment.

The method 200 in FIG. 4 is performed by the radio access network RAN, the core network CN (for example, an access and mobility management function network element AMF, a session management function network element SMF, or a user plane function network element UPF), the policy control function network element PCF, the data analysis function network element NWDAF, and the application function network element AF in the system shown in FIG. 1. By way of example, and not limitation, in the method of this embodiment, a service A is used as an example for description. In at least one embodiment, the service A is a service or a service flow. A quantity and a type of services are not limited in embodiments described herein.

In at least one embodiment, an NWDAF (namely, an example of a first network device) obtains a model inference result (namely, an example of a first analysis result of first data) of private data (namely, an example of the first data) of the terminal for the service A in a CN domain (namely, an example of a second network device) and a model inference result (namely, an example of a second analysis result of first data) of private data in a RAN domain (namely, an example of a third network device). The NWDAF determines a model inference result of service experience (namely, an example of first service experience information) of the network side based on the model inference result of the private data in the CN domain and the model inference result of the private data in the RAN domain. An application function network element (namely, an example of a fourth device) then determines a local application layer parameter of the AF based on the model inference result of service experience of the network side.

As shown in FIG. 4, the following describes each step in detail.

S201: The PCF sends a request #1 to the NWDAF, to subscribe to, from the NWDAF, a service experience data analysis result of using the service A by the terminal, namely, an inference result corresponding to a service experience model.

The request #1 includes one or more of the following information: an analysis identifier Analytics ID, a service identifier Application ID, and a terminal identifier UE ID (for example, a subscription permanent identifier (SUPI)).

Specifically, in at least one embodiment, the PCF triggers an Nnwdaf_AnalyticsSubscription_Subscribe service operation to the NWDAF, and subscribes to, from the NWDAF, the service experience data analysis result of using the service A by the terminal. The Nnwdaf_AnalyticsSubscription_Subscribe service operation includes, for example, the following information: Analytics ID=Service Experience, indicating the PCF to subscribe to a data analysis result of a service experience type from the NWDAF, where Analytics ID is further used to determine a service experience model used to generate the service experience data analysis result; Analytics Filter, indicating filtering information of a to-be-requested service experience data analysis result, for example, an Application ID indicating a service identifier of a service; and Target of Analytics Reporting, indicating an object of a to-be-requested model inference result, for example, an SUPI indicating a terminal identifier of the terminal.

In at least one embodiment, the request is a service model inference result request for one or some terminals of the service A, or is a service model inference result request for all terminals of the service A. A quantity of terminals is not limited in embodiments described herein.

S202: The NWDAF determines identification information of a service experience model of the service A.

In at least one embodiment, the NWDAF determines, based on the analysis identifier Analytics ID, that a service experience data analysis result of the service A needs to be obtained through service experience model inference, and determine, based on a historical training record, that the service experience model is obtained based on vertical federated learning training. It should be understood that, the identification information of the model is one or more of a Model ID, an Internet protocol (IP) address, a uniform resource locator (URL), and a fully qualified domain name (FQDN). In other words, both the analysis identifier and the identification information of the model is used to determine the service experience model used in the service experience data analysis result process.

As described above, a vertical federated learning model is as follows:

$$h(x_i) = \theta_A x_i^A + \theta_B x_i^B + \theta_C x_i^C + \theta_D x_i^D \qquad \text{Formula 10, where}$$

$x_i$ represents an $i$ th piece of sample data, $x_i^A$ is a local private data vector distributed on the RAN by the terminal for the service A, $x_i^B$ is a local private data vector distributed on the CN by the terminal for the service A, $x_i^C$ is a local private data vector distributed in the AF by the terminal for the service A, and $x_i^D$ is a public data vector actively reported by the RNA, the CN, and the AF in the sample data.

In at least one embodiment, the private data includes data that cannot be reported by each network element or nonstandardized data. The network element determines, based on data privacy, a data volume, or an equipment vendor policy of the network element, data that cannot be reported to the NWDAF. For example, a base station equipment vendor is unwilling to report a parameter of the RAN, for example, an energy saving parameter, a positioning parameter, or a radio resource management parameter, to protect product interests.

In at least one embodiment, the public data includes data that is reported by each network element to the NWDAF or standardized data. The network element determines, based on data privacy, a data volume, or an equipment vendor policy of the network element, data that is reported to the NWDAF. For example, the public data reported by each network element includes: radio signal quality reported by the RAN, such as reference signal received power (RSRP), reference signal received quality (RSRQ), and signal to interference plus noise ratio (SINR); QoS-related parameters reported by the UPF, such as a flow bit rate (QoS flow bit rate), a flow delay (QoS flow packet delay), and a flow packet error rate (QoS flow packet error rate); service flow-related parameters reported by the AF, such as an application layer buffer size corresponding to a service flow and service flow service experience, and the like.

Model parameters $\theta_A$, $\theta_B$, $\theta_C$, and $\theta_D$ correspond to $x_i^A$, $x_i^B$, $x_i^C$, and $x_i^D$ respectively, and are model parameter vectors trained by each domain based on local private data or public data reported by each domain. Each model parameter vector includes one or more model parameters.

Model parameters of the vertical federated learning model in at least one embodiment are pre-trained, and the trained model parameters are locally stored in each domain. The service experience model used in the model inference phase of the service A is determined based on the analysis identifier and/or the identification information of the model. The model inference process is described in embodiment herein.

S203: The NWDAF sends a request to each domain, to request a model inference result and/or public data of the terminal for the service A.

In at least one embodiment, the NWDAF sends a subscription request to the CN and the RAN, to request to subscribe to model inference results of the terminal for the service A in the core network domain and the access network domain respectively.

In at least one embodiment, the NWDAF sends a subscription request to the CN and the RAN, to request to subscribe to model inference results and public data (namely, an example of second data) of the terminal for the service A in the core network domain and the access network domain respectively.

In some other embodiments, the NWDAF sends a subscription request to the CN, the RAN, and the AF, to request to subscribe to model inference results of the terminal for the service A in the core network domain, the access network domain, and the service provider respectively.

In some other embodiments, the NWDAF sends a subscription request to the CN, the RAN, and the AF, to request to subscribe to model inference results and public data of the terminal for the service A in the core network domain, the access network domain, and the service provider.

S203a: The NWDAF sends a request #2 (namely, an example of a first request) to the CN, to subscribe to a model inference result of service experience of the terminal for the service A in the core network domain from the CN.

In at least one embodiment, the request #2 is also used to subscribe to public data of the terminal for the service A in the core network domain from the CN.

The request #2 includes the following content: a first identifier of the terminal and at least one of the following information: an analysis identifier and identification information of a first model, where the analysis identifier and/or the identification information of the first model is for determining a model used by the terminal for service experience model inference on the core network device.

Specifically, in at least one embodiment, the NWDAF triggers an Nnf_AnalyticsSubscription_Subscribe service operation to the 5GC NF to subscribe to the model inference result of service experience of the terminal for the service A in the core network domain from the CN. The service operation includes a terminal identifier, for example, an SUPI or a GPSI, and model identification information of the service A, for example, one or more of a Model ID, an IP address, a URL, and an FQDN.

In at least one embodiment, the NWDAF triggers an Nnf_EventExposure_Subscribe service operation to the 5GC NF to subscribe to the public data of the terminal for the service A in the core network domain from the 5GC NF. The service operation includes a data type Event ID of the public data in the core network domain and a terminal identifier SUPI.

S203b: The NWDAF sends a request #3 (namely, an example of a second request) to the RAN, to subscribe to a model inference result of service experience of the terminal in the RAN domain from the RAN.

In at least one embodiment, the request #3 is also used to subscribe to public data of the terminal for the service A in the access network domain from the RAN.

The request #3 further includes the following content: a second identifier of the terminal and at least one of the following information: an analysis identifier and identification information of a second model, where the analysis identifier and/or the identification information of the second model is for determining a model used by the terminal for service experience model inference on the access network device.

The identification information of the terminal in at least one embodiment is one or more of the following: an Internet protocol (IP) address, a subscription permanent identifier (SUPI), a permanent equipment identifier (PEI), a generic public subscription identifier (GPSI), an international mobile subscriber identifier (IMSI), an international mobile equipment identity (EVIEI), an IP address, and a mobile station international integrated service digital network number (MSISDN). For any identification information (for example, the first identifier of the terminal and the second identifier of the terminal) of the terminal involved in the following embodiments, refer to the description herein. Details are not described below again.

Specifically, in at least one embodiment, the NWDAF sends a subscription message to the RAN, to subscribe to, from the RAN, the model inference result of service experience of the terminal for the service A in the access network domain. The subscription message includes identification information of the service experience model, for example, one or more of a model ID, an IP address, a URL, and an FQDN. The access network allocates an identifier RAN UE NGAP ID to the terminal on an NG interface or an N2 interface, where the NG interface or the N2 interface is an interface between the RAN and the AMF.

In at least one embodiment, the NWDAF sends a subscription request to the RAN, to subscribe to the public data of the terminal in the access network domain for the service A from the RAN. The subscription message includes a data type RAN Parameter Type of the public data in the access network domain and the identifier RAN UE NGAP ID allocated by the access network to the terminal on the NG interface or the N2 interface.

In at least one embodiment, step S203c is further included: The NWDAF sends a request #4 (namely, an example of a third request) to the AF, to subscribe to a model inference result of service experience of the terminal for the service A in the AF domain from the AF.

In at least one embodiment, the request #4 is also used to request the AF for the public data of the terminal for the service A in the AF domain.

The request #4 further includes the following content: a third identifier of the terminal and at least one of the following information: an analysis identifier and identification information of a third model, where the analysis identifier and/or the identification information of the third model is for determining a model used by the terminal for service experience model inference on the AF.

In at least one embodiment, the NWDAF triggers an Naf_AnalyticsSubscription_Subscribe service operation to the AF to subscribe to, from the AF, a model inference result of service experience of the terminal in the AF domain. The service operation includes identification information of the service experience model, for example, one or more of a Model ID, an IP address, a URL, and an FQDN. The identifier of the terminal includes a subscription permanent identifier SUPI or a generic public subscription identifier GPSI.

In at least one embodiment, in at least one embodiment, the NWDAF triggers an Naf_EventExposure_Subscribe service operation to the AF to subscribe to the public data of the terminal in the AF domain from the AF. The service operation includes a data type Event ID of the public data in the AF domain and a terminal identifier SUFI or GPSI.

S204: Each domain receives the subscription request of the NWDAF, generates a local model inference result of the terminal in each domain for the service A, and sends a response to the NWDAF, where the response includes the local model inference result in each domain.

As described above, after the vertical federated learning training ends, for example, private data of the terminal #1 for the service A in each domain is $(x_k^A, x_k^B, x_k^C)$. In an inference phase, each domain calculates a local inference result $[\theta_A x_i^A, \theta_B x_i^B, \theta_C x_i^C]$ of the terminal #1 for the service A based on trained model parameters $\theta_A$, $\theta_B$, $\theta_C$, and $\theta_D$. Private data of the terminal #2 in each domain is $(x_j^A, x_j^B, x_j^C)$. In the inference phase, each domain calculates a local inference result $[\theta_A x_2^A, \theta_B x_2^B, \theta_C x_2^C]$ of the terminal #2 for the service A based on trained model parameters $\theta_A$, $\theta_B$, $\theta_C$, and $\theta_D$. Similarly, for a terminal #n, each domain calculates a local inference result $[\theta_A x_n^A, \theta_B x_n^B, \theta_C x_n^C]$ of the terminal #n for the service A based on trained model parameters $\theta_A$, $\theta_B$, $\sigma_C$, and $\theta_D$. In other words, for a plurality of terminals, each domain calculates a model inference result of each terminal locally. Finally, the domains send the model inference results of the plurality of terminals to the NWDAF.

For example, in at least one embodiment, for the service A, the RAN obtains, through calculation, model inference results of n terminals, namely, $[\theta_A x_1^A, \theta_A x_2^A \ldots \theta_A x_n^A]$. The RAN aggregates and packs the model inference results of the plurality of terminals, and sends the model inference result to the NWDAF. In other words, the model inference result $[\theta_A x_i^A]$ sent by the RAN to the NWDAF actually includes the model inference results of the plurality of terminals in the RAN domain. For ease of description, in at least one embodiment, model inference results of a plurality of terminals or one terminal are represented by $[\theta_A x_i^A]$. A model inference result of a terminal in another domain below also represents a model inference result of a plurality of terminals or one terminal. Details are not described again.

In at least one embodiment, in response to public data existing in each domain, each domain simultaneously sends local public data corresponding to an inference data result of each terminal in each domain, and the public data is corresponding through association information.

S204a: The CN sends a response #1 (namely, an example of a first response) to the NWDAF.

The response #1 is used by the CN to report a model inference result (namely, an example of first information) of the terminal for the service A in the core network domain. Response information a further includes association information, namely, association information of the terminal between the RAN and the AMF (namely, an example of first association information) and association information of the terminal between the UPF and the AF (namely, an example of second association information).

The association information between the RAN and the AMF and the association information between the UPF and the AF herein are used to distinguish between terminals and sources of the terminals. In other words, a unique identifier is allocated to each terminal on a corresponding interface, so that each terminal and a source of the terminal is distinguished.

In at least one embodiment, the CN triggers an Nnf_AnalyticsSubscription_Notify service operation to the NWDAF to send a model inference result of service experience of the terminal in the core network domain to the NWDAF, for example, $\theta_B x_i^B$. The service operation further includes association information of the terminal between the RAN and the AMF, for example, a RAN UE NGAP ID identifier, a global unique identifier Global RAN Node ID of the RAN, a timestamp that exists in response to data locally for inference in the core network domain being generated on the core network element, namely, a Timestamp, and association information of the terminal between the UPF and the AF, for example, an IP quintuple (namely, a source IP address, a destination IP address, a source port number, a destination port number, and a protocol number), or a timestamp that exists in response to local inference data on the UPF on the core network side being generated.

In at least one embodiment, in response to public data existing in the CN, the response information a indicates the public data of the terminal in the core network domain to the CN. In at least one embodiment, the CN triggers an Nnf_EventExposure_Notify service operation to the NWDAF to send the public data of the terminal in the core network domain, the association information of the terminal between the RAN and the AMF, and the association information of the terminal between the UPF and the AF to the NWDAF.

S204b: The RAN sends a response #2 (namely, an example of a second response) to the NWDAF.

The response #2 is used by the RAN to indicate a model inference result (namely, an example of second information) of the terminal for the service A in the access network domain to the NWDAF, and the response #2 further includes the association information of the terminal between the RAN and the AMF.

In at least one embodiment, the RAN sends a RAN-side data analysis result notification message to the NWDAF, where the message includes a model inference result of service experience of the terminal in the access network domain, for example, $\theta_A x_i^A$, and the association information of the terminal between the RAN and the AMF, including a RAN UE NGAP ID identifier, a global unique identifier Global RAN Node ID of the RAN, and a timestamp timestamp that exists in response to local data on the access network side for inference being generated on the access network.

In at least one embodiment, in response to public data existing in the RAN, the response #2 is further used by the RAN to send the public data of the terminal in the access network domain to the NWDAF. In at least one embodiment, the RAN sends a RAN-side data notification message to the NWDAF, where the message includes the public data of the terminal in the access network domain and the corresponding association information of the terminal between the RAN and the AMF, for example, a RAN UE NGAP ID identifier, a global unique identifier Global RAN Node ID of the RAN, and a timestamp timestamp that exists in response to local data on the access network side for inference being generated on the access network.

In at least one embodiment, step S204c is further included: The AF sends a response #3 (namely, an example of a third response) to the NWDAF.

The response #3 is used by the AF to send a model inference result (namely, an example of third information) of the terminal for the service A in the AF domain, and the response #3 further includes the association information of the terminal between the UPF and the AF.

In at least one embodiment, in at least one embodiment, the AF triggers an Naf_AnalyticsSubscription_Notify service operation to the NWDAF to send, to the NWDAF, a model inference result of service experience, for example, $\theta_C x_n{}^C$, of the terminal in an application domain and the corresponding association information of the terminal between the UPF and the AF, for example, an IP quintuple and a timestamp that exists in response to public data in a third-party application AF domain being generated.

In at least one embodiment, in at least one embodiment, in response to public data existing in the AF, the response #3 is further used by the AF to report the public data of the terminal in the application domain. In at least one embodiment, the AF triggers an Naf_EventExposure_Notify service operation to the NWDAF, to send the public data of the terminal in the AF domain and the corresponding association information of the terminal between the UPF and the AF to the NWDAF.

S205: The NWDAF receives the response information, and determines a model inference result of service experience data of the terminal for the service A in each domain.

Specifically, the NWDAF determines the model inference result of the service experience data of the terminal for the service A in each domain through the association information.

Generally, in response to the NWDAF needing to analyze data of each terminal from end to end between the RAN, the CN, and the AF, the data of each terminal distributed on the RAN, the CN, and the AF is to be associated. Generally, the NWDAF pairwise associates data of terminals in each domain through association identifiers, so that the data of each terminal in each domain is finally determined.

In at least one embodiment, the RAN, the CN, and the AF all report a model inference result and association information of each terminal in each domain to the NWDAF. Based on the association information reported from each domain, the NWDAF aggregates model inference results of each terminal in the RAN domain, the CN domain, and the AF domain. In other words, the NWDAF obtains a model inference result of service experience of each terminal in each domain by aggregating the association information.

In at least one embodiment, the NWDAF uses the following association manner:

The NWDAF associates a model inference result $\theta_B x_i{}^B$ of the terminal in the core network domain and a model inference result $\theta_A x_i{}^A$ of the terminal in the access network domain based on the association information between the RAN and the AMF, to finally obtain a local model inference result $[\theta_A x_i{}^A + \theta_B x_i{}^B]$ of the terminal in each domain.

In at least one embodiment, in at least one embodiment, the NWDAF uses the following association manner:

The NWDAF associates the model inference result $\theta_B x_i{}^B$ of the terminal in the core network domain and the model inference result $\theta_A x_i{}^A$ of the terminal in the access network domain based on the association information between the RAN and the AMF, and further associates the model inference result $\theta_A x_i{}^A$ of the terminal in the core network domain and a model inference result $\theta_C x_i{}^C$ of the terminal in the AF domain based on the association information between the UPF and the AF, to finally obtain a local model inference result $[\theta_A x_i{}^A + \theta_B x_i{}^B + \theta_C x_i{}^C]$ of the terminal in each domain.

The association method in at least one embodiment is merely an example, and shall not constitute any limitation. Embodiments described herein do not exclude a possibility of implementing a same or similar function by using another association method between network elements.

In at least one embodiment, in response to each domain sending public data, the NWDAF performs inference on the public data. For example, in at least one embodiment, in response to each domain sending public data, in at least one embodiment, the NWDAF associates the public data of the terminal in the core network domain and the public data of the terminal in the access network domain based on the association information between the RAN and the AMF, for example, $x_i{}^D$. The NWDAF then determines an inference result $\theta_D x_i{}^D$ of the public data based on a local model parameter $\theta_D$.

In some other embodiments, in response to each domain sending public data, the NWDAF performs inference on the public data. For example, in at least one embodiment, the NWDAF associates the public data of the terminal in the core network domain and the public data of the terminal in the access network domain based on the association information between the RAN and the AMF, and further associates the public data of the terminal in the core network domain and the public data of the terminal in the AF domain based on the association information between the UPF and the AF, to finally obtain the public data of the terminal in each domain, for example, $x_i{}^D$. The NWDAF then determines the inference result $\theta_D x_i{}^D$ of the public data based on the local model parameter $\theta_D$.

The local inference result of the NWDA includes one or more of the core network domain, the access network domain, and the application domain, depending on whether each domain reports respective public data. A case described in at least one embodiment is that the core network domain, the access network domain, and the application domain all report respective public data. Therefore, the local inference result of the NWDA is a common inference result of the public data of the three parties. However, this case is merely an example, and shall not constitute any limitation on embodiments described herein.

For example, in response to model inference results in each domain being all linear results, the NWDAF aggregates model inference results of service experience of the terminal in each domain in a summation manner. For example, in response to the model inference results in each domain being all logical quantities, the NWDAF first aggregates the model inference results of service experience of the terminal in each domain in the summation manner, and then obtain a final model inference result of service experience by performing a logarithmic operation. The foregoing is merely an example, and a manner in which the NWDAF aggregates the model inference results of service experience is not limited in embodiments described herein. Based on an actual situation, the NWDAF flexibly performs calculation to obtain a model inference result of service experience of the terminal in each domain.

In at least one embodiment, the model inference result of service experience of the terminal finally obtained by the NWDAF through aggregation is $[\theta_A x_i^A + \theta_B x_i^B]$.

In at least one embodiment, the model inference result of service experience of the terminal finally obtained by the NWDAF through aggregation is $[\theta_A x_i^A + \theta_B x_i^B + \theta_D x_i^D]$.

In some other embodiments, the model inference result of service experience of the terminal finally obtained by the NWDAF through aggregation is $[\theta_A x_i^A + \theta_B x_i^B + \theta_C x_i^C]$.

In some other embodiments, the model inference result of service experience of the terminal finally obtained by the NWDAF through aggregation is $[\theta_A x_i^A + \theta_B x_i^B + \theta_C x_i^C + \theta_D x_i^D]$.

A local model inference result of the terminal in each domain finally aggregated by the NWDAF is an average or a square difference of local model inference results of a plurality of terminals in each domain.

S206: The NWDAF sends a response #4 to the PCF.

The response #4 is used by the NWDAF to send a service experience data analysis result of the terminal, namely, the foregoing model inference result, to the PCF. In at least one embodiment, the NWDAF triggers an Nnwdaf_AnalyticsSubscription_Notify service to the PCF, and sends the model inference result $[\theta_A x_i^A + \theta_B x_i^B]$ of the service A of the terminal to the PCF.

In at least one embodiment, the NWDAF triggers the Nnwdaf_AnalyticsSubscription_Notify service to the PCF, and provides the model inference result $[\theta_A x_i^A + \theta_B x_i^B + \theta_C x_i^C + \theta_D x_i^D]$ of the service A of the terminal to the PCF.

S207: The PCF determines a QoS parameter of the service A.

The PCF receives the response #4 and determines the QoS parameter.

In at least one embodiment, the PCF calculates a new QoS parameter of the service A based on response information d. As described above, the PCF calculates the QoS parameter based on a service model inference result of the terminal and a service experience requirement through a multi-criteria decision-making algorithm. In response to the PCF obtaining a suitable QoS parameter through calculation, the network side adjusts application layer parameters based on the new QoS parameter to improve the service experience of the terminal for the service A.

An experience requirement of the service A (namely, an example of second service experience information) in this embodiment is pre-configured or preset by the network. For example, the experience requirement of the service A is N (N>0), where N is a positive integer.

In the current technology, although the PCF also calculates the QoS parameter based on the "service experience data analysis result", a "service experience model data analysis result" in the current technology is different from the model inference result of service experience in at least one embodiment. The service model inference result of the terminal in embodiments described herein refers to a model inference result of private data of the terminal for the service in each domain. In other words, the NWDAF obtains network-side information including private data and public data.

Based on a model inference result of service experience of the terminal and a service experience requirement, the PCF attempts to calculate a new QoS parameter of the service, and finds that a suitable QoS parameter cannot be obtained through calculation, which indicates that the network side cannot perform adjustment in this case.

S208: The PCF sends first indication information to the NWDAF.

The PCF sends the first indication information to the NWDAF, to indicate to the NWDAF that adjustment of the network side for the service of the terminal has reached a limit, but the service experience requirement still cannot be met.

S209: The NWDAF receives the first indication information, and determines first service experience information, where the first service experience information is for determining an application parameter in the AF.

In at least one embodiment, the NWDAF determines the first service experience information based on the foregoing indication information, the service experience requirement pre-configured by the network, the core network domain, the access network domain, and the inference result of the public data.

In at least one embodiment, the first service experience information includes a sum of model inference results of service experience of the terminal in the core network domain and the access network domain, namely, $[\theta_A x_i^A + \theta_B x_i^B]$.

In another example, in response to a service experience requirement pre-configured on the PCF network element or the NWDAF network element is that a service experience MOS score being greater than or equal to 3.0 points, and a maximum service experience requirement that is met by the RAN and the CN is that the MOS score being less than or equal to 2.0 points, the NWDAF sends the maximum service experience requirement MOS score that is met by the network side and that is less than or equal to 2.0 points, namely, the value 2.0 of the maximum service experience requirement that is met by the network side to the AF.

In at least one embodiment, the first service experience information includes a sum of model inference results of the terminal in the core network domain, the access network domain, and the public data on the NWDAF, namely, $[\theta_A x_i^A + \theta_B x_i^B + \theta_D x_i^D]$.

In at least one embodiment, the first service experience information includes a sum of model inference results of service experience of the terminal in the core network domain, the access network domain, and the application domain, namely, $[\theta_A x_i^A + \theta_B x_i^B + \theta_C x_i^C]$.

In at least one embodiment, the first service experience information includes a sum of public data model inference results of service experience of the terminal in the core network domain, the access network domain, the application domain, and the NWDAF, namely, $[\theta_A x_i^A + \theta_B x_i^B + \theta_C x_i^C \theta_D x_i^D]$.

In some other embodiments, the first service experience information includes a service experience requirement that are to be met on the AF side: [service experience requirement $-(\theta_A x_i^A + \theta_B x_i^B)$].

In an example, in response to a service experience requirement preset by the network is that a service experience MOS score being greater than or equal to 3.0 points, and a maximum service experience requirement that is met by the RAN and the CN is that the MOS score being less than or equal to 2.0 points, for the AF side, the service experience requirement at least is to meet that the MOS score is greater than or equal to 1.0 points. To be specific, the NWDAF directly sends, to the AF, the calculated value 1.0 of the service experience requirement that the AF side is to meet.

In some other embodiments, the first service experience information includes a service experience requirement that is to be met on the AF side: [service experience requirement$-(\theta_A x_i^A + \theta_B x_i^B + \theta_D x_i^D)$].

In some other embodiments, the first service experience information includes a service experience requirement that is to be met on the AF side:

[service experience requirement$-(\theta_A x_i^A + \theta_B x_i^B + \theta_C x_i^C)$].

In some other embodiments, the first service experience information includes a service experience requirement that is to be met on the AF side: [service experience requirement$-(\theta_A x_i^A + \theta_B x_i^B + \theta_C x_i^C + \theta_D x_i^D)$].

In response to each domain not reporting respective public data, the first service experience information herein does not include an inference result of public data, in other words, does not include a local inference result of the NWDA.

S210: The NWDAF sends the first service experience information to the AF.

In at least one embodiment, the NWDAF triggers an Nnwdaf_AnalyticsSubscription_Notify service operation to the AF, and sends the first service experience information to the AF.

S211: The AF receives the first service experience information, and determines a local application layer QoS parameter configuration of the service A based on the first service experience information.

In at least one embodiment, the AF determines the local application layer QoS parameter configuration based on the first service experience information, namely, [service experience requirement$-(\theta_A x_i^A + \theta_B x_i^B + \theta_D x_i^D)$], and the multi-criteria decision-making algorithm.

In some other embodiments, the AF first determines, based on the first service experience information [$\theta_A x_i^A + \theta_B x_i^B + \theta_D x_i^D$], that the service experience requirement that is to be met by the AF side is: [service experience requirement$-(\theta_A x_i^A + \theta_B x_i^B + \theta_D x_i^D)$], and further determines the local application layer QoS parameter configuration based on the service experience requirement that is to be met by the AF side and the MCDM algorithm.

In at least one embodiment, the AF determines the local application layer QoS parameter configuration based on the first service experience information, namely, [service experience requirement$-(\theta_A x_i^A + \theta_B x_i^B + \theta_D x_i^D)$], and the MCDM algorithm.

In some other embodiments, the AF determines, based on the first service experience information [$\theta_A x_i^A + \theta_B x_i^B$], that the service experience requirement that is to be met by the AF network element is: [service experience requirement$-(\theta_A x_i^A + \theta_B x_i^B)$], and further determines the local application layer QoS parameter configuration based on the service experience requirement that is to be met by the AF network element and the MCDM algorithm.

According to the method in this embodiment, the NWDAF obtains the model inference result of the terminal for the service A in each domain, and sends the model inference result of the service flow to the application function network element. The application function network element performs parameter adjustment based on the model inference result in each domain, to improve accuracy of adjusting an application layer parameter by the application function network element, and further improve service experience of the service of the terminal.

Figure 5:
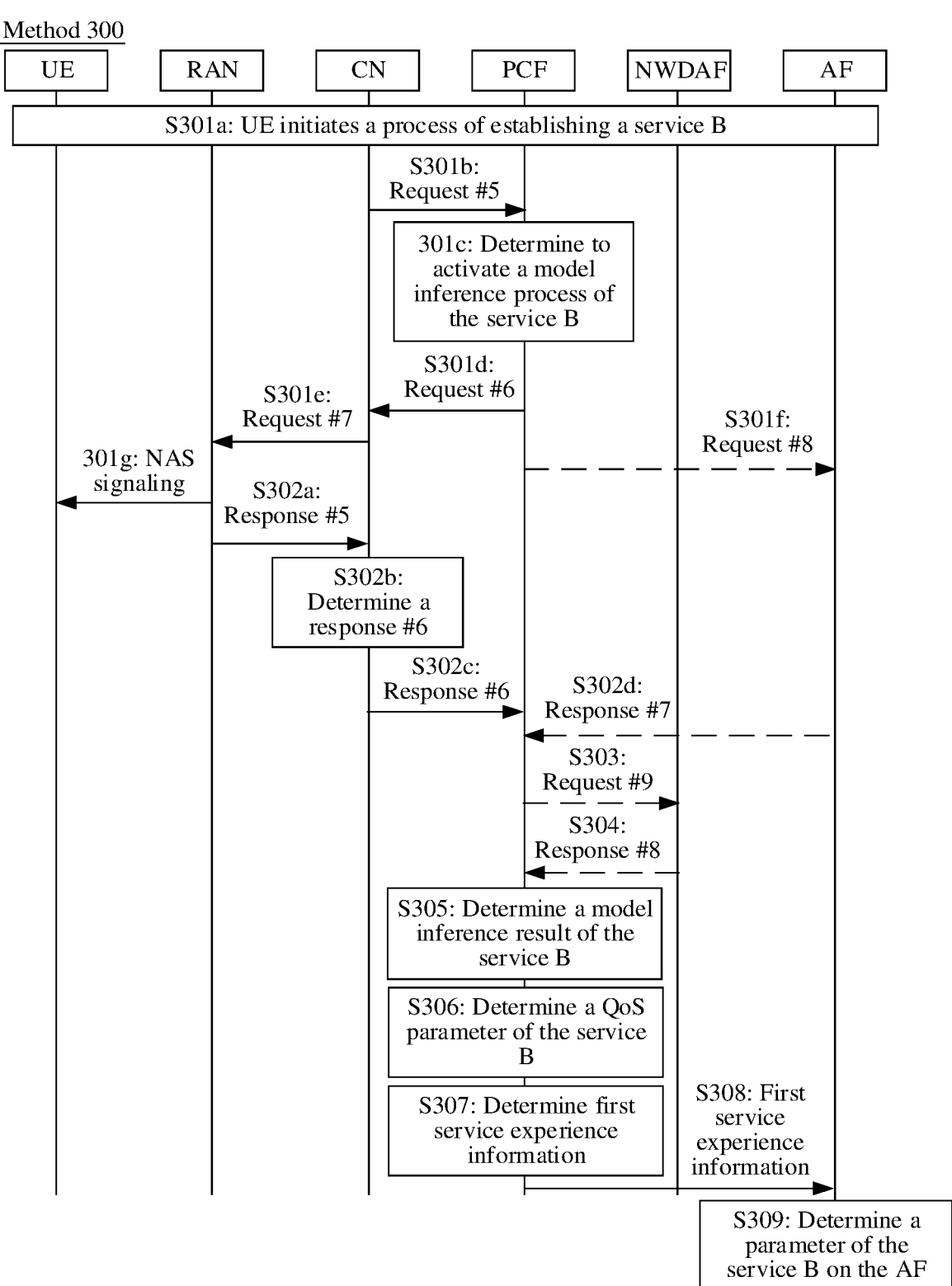
FIG. 5 is a schematic flowchart of a communication method according to at least one embodiment.

FIG. 5 is a schematic flowchart of a communication method 300 according to at least one embodiment. The method 300 in FIG. 5 is performed by the RAN, the core network element (for example, the AMF network element, the UPF network element, and the SMF network element), the PCF network element, the NWDAF network element, and the AF network element in the system shown in FIG. 1. In the method in this embodiment, by way of example, and not limitation, a service B is used as an example for description.

It should be understood that, in the method in this embodiment, the PCF is an example of a first network device, the CN is an example of a second network device, the RAN is an example of a third network device, and the AF is an example of a fourth network device. It should be noted that, this embodiment is merely an example and shall not constitute any limitation embodiments described herein. The first network device is alternatively another network element, and the second network device, the third network device, and the fourth network device is alternatively other network elements.

As shown in FIG. 5, the following describes each step in detail.

S301: In a process of establishing the service B initiated by a terminal or the AF, the PCF activates inference based on a service experience model obtained through vertical federated training.

S301a: UE triggers the process of establishing the service B, namely, a PDU Session Modification process initiated by the UE.

In at least one embodiment, the AF triggers the process of establishing the service B. In this case, the process is a PDU Session Modification process initiated by the AF.

An entity for triggering the service establishment process is not limited in at least one embodiment, and the foregoing entity for triggering the service establishment process is merely an example.

S301b: The SMF sends a request #5 to the PCF.

The request #5 is used by the SMF to request the PCF for a QoS parameter for using the service B by the terminal in a session. The request #5 further includes one or more of a terminal identifier SUPI, a session identifier PDU Session ID, and a service identifier Application ID.

In at least one embodiment, the SMF triggers an Npcf_SMPolicyControl_Update Request service operation to the PCF, and requests the PCF for the QoS parameter for using the service B by the terminal in the session. The service operation carries one or more of the following identifiers: the terminal identifier SUPI, the session identifier PDU Session ID, and the service identifier Application ID.

S301c: The PCF receives the request #5, and determines to activate a model inference process corresponding to the service B.

In at least one embodiment, the PCF receives the request #5, and determines, based on the service identifier and a local operator policy, that a model inference result of service experience of the service B is to be requested from the NWDAF for adjusting the QoS parameter of the service. Therefore, the PCF requests the NWDAF to activate a service experience model corresponding to the service B, and determines, from the NWDAF, identification information (one or more of a Model ID, an IP address, a URL, and an FQDN) of the service experience model and that the model is a vertical federated model. Finally, the PCF determines to activate, in a remaining PDU Session Modification procedure, an inference process of the service experience model for the service of the terminal.

S301d: The PCF sends a request #6 to the CN, to request a model inference result of service experience of the terminal for the service B in the CN domain.

In at least one embodiment, the request #6 is further for requesting public data of the terminal for the service B in the CN domain.

The request #6 includes first identification information of the terminal and at least one of the following information: an analysis identifier and identification information of a first model. In at least one embodiment, the request #6 further includes indication information a and indication information b.

In at least one embodiment, in at least one embodiment, the PCF triggers an Npcf_SMPolicyControl_Update Response service operation to the CN, where the service operation includes the first identification information of the terminal, the model identifier Model ID of the service B, the indication information a, and the indication information b. The indication information a indicates the CN to report a model inference result of service experience of the terminal for the service B in the CN domain, and the indication information b indicates the CN to report public data of the terminal in the CN domain.

S301e: The CN sends a request #7 to the RAN, to request a model inference result of service experience of the terminal for the service B in the RAN domain.

In at least one embodiment, the request #7 is further for requesting public data of the terminal for the service B in the RAN domain.

The request #7 includes second identification information of the terminal and at least one of the following information: an analysis identifier and identification information of a second model. In at least one embodiment, the request #7 further includes indication information e and indication information f.

In at least one embodiment, in at least one embodiment, the CN sends an N2 PDU Session Request to the RAN, where the request includes identification information of the terminal, the identifier Model ID of the service experience model of the service B, indication information c, and indication information d. The indication information c indicates the RAN to report the model inference result of service experience of the terminal for the service B in the RAN domain, and the indication information f indicates the RAN to report public data of the terminal for the service B in the RAN domain.

In some other embodiments, step S301f is further included: The PCF sends a request #8 to the AF, to request a model inference result of service experience of the terminal for the service B in the AF domain.

In some other embodiments, the request #8 is further for requesting public data of the terminal for the service B in the AF domain.

The request #8 includes third identification information of the terminal and at least one of the following information: an analysis identifier and identification information of a third model. In at least one embodiment, the request #8 further includes the indication information e and the indication information f.

In at least one embodiment, in at least one embodiment, the PCF sends an Event Reporting service operation to the AF, where the service operation includes identification information (for example, a terminal identifier SUPI or GPSI) of the terminal, identification information (one or more of a Model ID, an IP address, a URL, and an FQDN) of a model, the indication information e, and the indication information f. The indication information e indicates the AF to report the model inference result of service experience of the terminal for the service B in the AF domain, and the indication information f indicates the AF to report the public data of the terminal in the AF domain.

S301g: The RAN sends NAS signaling to the UE, to complete the service establishment process.

In at least one embodiment, the RAN sends NAS signaling of a PDU Session Modification Command type to the UE, to complete the service establishment process.

S302: Each domain receives the request of the PCF, and sends a respective local model inference result of service experience to the PCF.

In at least one embodiment, in response to public data existing in each domain, each domain also sends local public data.

S302a: The RAN sends a response #5 to the CN.

The response #5 is used by the RAN to send a model inference result of service experience of the terminal for the service B in the access network domain to the CN, and the response #5 further includes association information.

In at least one embodiment, the RAN sends an N2 message to the CN. The message includes the model inference result of the terminal in the access network domain, for example, $\theta_A x_i^A$. The N2 message further includes association information of the terminal between the RAN and the AMF, for example, a RAN UE NGAP ID identifier, a global unique identifier Global RAN Node ID of the RAN, and a timestamp timestamp that exists in response to local inference data on the access network side being generated.

In some other embodiments, in response to public data existing in the RAN, the response #5 is used by the RAN to send public data of the terminal for the service B in the access network domain to the CN.

In some other embodiments, in at least one embodiment, the RAN sends the N2 message to the CN, where the message includes the public data of the terminal in the access network domain and the corresponding association information of the terminal between the RAN and the AMF.

S302b: The CN receives the response #5, and determines a response #6 based on the response #5.

In at least one embodiment, the CN determines the response #6 based on the response #5. The response #6 is used by the CN to send the model inference results of service experience in the access network domain and the core network domain to the PCF, and the response #6 further includes association information between the UPF and the AF.

In at least one embodiment, the CN first determines, based on the association information between the RAN and the AMF, inference data used for local service experience in the CN domain and the association information between the UPF and the AF in the core network domain, further determines a model inference result of service experience $\theta_B x_i^B$ in the CN domain based on a local vertical federated model Model ID, and finally sends the model inference results of service experience in the access network domain and the core network domain and the association information between the UPF and the AF to the PCF.

S302c: The CN sends the response #6 to the PCF.

In at least one embodiment, the CN triggers an Npcf_SM-Policy Control_Update Request service operation to the PCF, where the service operation includes the model inference result of service experience of the terminal for the service in the RAN domain and the service operation includes the model inference result of service experience of the terminal for the service in the CN domain. The response #6 further includes the association information between the UPF and the AF.

In response to there being public data in the access network domain and the core network domain, the response #6 further includes the public data of the terminal in the access network domain and the core network domain.

In some other embodiments, step S302d is further included: The AF sends a response #7 to the PCF.

The response #7 is used by the AF to send the model inference result of service experience of the terminal in the AF domain to the PCF, and the response #7 further includes the association information between the UPF and the AF.

In at least one embodiment, the AF sends, to the PCF, the model inference result of service experience, for example, $\theta_C x_i^C$, of the terminal for the service B in the AF domain and the corresponding association information of the terminal between the UPF and the AF, including an IP quintuple and a timestamp that exists in response to data for inference in the AF domain being generated on the AF.

In some other embodiments, in response to the public data existing in the AF, the response #7 further includes the public data of the terminal in the AF domain. In at least one embodiment, the AF sends, to the PCF, the public data of the terminal for the service B in the AF and the corresponding association information of the terminal between the UPF and the AF.

In at least one embodiment, in response to a domain reporting local public data, step S303 is further included: The PCF sends a request #9 to the NWDAF, to request the NWDAF for a model inference result of the public data in the RAN domain, the public data of the core network, or the public data of the AF of the terminal for the service B.

In response to one or more domains in the domains reporting public data, the NWDAF performs inference on the public data. In an example, in this embodiment, the CN, the RAN, and the AF all report public data, and the NWDAF performs inference on the public data.

In at least one embodiment, the NWDAF associates the public data of the terminal in the core network domain and the public data of the terminal in the AF domain based on the association information between the UPF and the AF, to finally obtain the public data of the terminal in each domain. The NWDAF then determines an inference result, for example, $\theta_D x_i^D$, of the public data based on a local model parameter.

In at least one embodiment, the public data of the terminal in the CN, in the RAN, and in the AF is obtained based on the association information between the UPF and the AF. This is because the CN has aggregated the local public data of the CN domain and the RAN domain in steps S320b and S320c.

In at least one embodiment, in S304, the NWDAF sends a response #8 to the PCF, to send an inference result of public data on the NWDAF.

S305: The PCF determines a model inference result of service experience of the service B in each domain.

In at least one embodiment, the PCF determines the model inference result of the terminal in each domain in the following association manner:

The PCF associates the model inference result $\theta_B x_i^B$ of the terminal in the access network domain, the model inference result $\theta_B x_i^B$ of the terminal in the core network domain, and the model inference result $\theta_C x_i^C$ of the terminal in the AF domain based on the association information between the UPF and the AF. Finally, the PCF obtains the local model inference result $[\theta_A x_i^A + \theta_B x_i^B + \theta_C x_i^C]$ of the terminal in each domain.

Optionally, in response to each domain sending public data, in at least one embodiment, the PCF finally determines the model inference result of service experience $[\theta_A x_i^A + \theta_B x_i^B + \theta_C x_i^C + \theta_D x_i^D]$ of the terminal.

A manner in which the PCF aggregates the model inference results of service experience is not limited in at least one embodiment. Based on an actual situation, the PCF flexibly performs calculation to obtain a model inference result of service experience of the terminal in each domain.

A local model inference result of the terminal in each domain finally aggregated by the PCF is an average or a square difference of local model inference results of a plurality of terminals in each domain.

S306: The PCF calculates a QoS parameter based on the model inference result of service experience of the terminal.

In at least one embodiment, the PCF calculates a new QoS parameter of the service based on the model inference result of service experience of the terminal. As described above, the PCF attempts to calculate the new QoS parameter of the service based on the model inference result of service experience of the terminal and a service experience requirement through the multi-criteria decision-making algorithm. However, the PCF finds that no suitable QoS parameter is obtained through calculation. This indicates that the network side cannot perform adjustment.

S307: The PCF determines first service experience information, where the first service experience information is for determining a parameter of the service B on the AF.

In at least one embodiment, the PCF determines, based on the service experience requirement, the model inference result of service experience in the core network domain, and the model inference result of service experience in the access network domain, a service experience requirement that is to be met by the AF side: [service experience requirement−$(\theta_A x_i^A + \theta_B x_i^B)$].

In an example, in response to a service experience requirement pre-configured by the network is that a service experience MOS score being greater than or equal to 4.0 points, and a maximum service experience requirement that is met by the RAN domain and the CN domain is that the MOS score being less than or equal to 3.0 points, for the AF side, the service experience requirement at least is to meet that the MOS score is greater than or equal to 1.0 points. To be specific, the PCF directly sends, to the AF, the calculated value 1.0 of the service experience requirement that the AF domain is to meet.

In at least one embodiment, the PCF determines, based on the service experience requirement, the model inference result of service experience in the core network domain, the model inference result of service experience in the access network domain, and the inference result of the public data on the NWDAF, a service experience requirement that needs to be met by the AF domain: [service experience requirement−$(\theta_A x_i^A + \theta_B x_i^B + \theta_D x_i^D)$].

In at least one embodiment, the PCF determines, based on the service experience requirement, the model inference result of service experience in the core network domain, the model inference result of service experience in the access network domain, and the model inference result of service experience in the application domain, a service experience requirement that is to be met by the AF domain: [service experience requirement−$(\theta_A x_i^A + \theta_B x_i^B + \theta_C x_i^C)$].

In at least one embodiment, the PCF determines, based on the service experience requirement, the model inference result of service experience in the core network domain, the model inference result of service experience in the access network domain, the model inference result of service experience in the application domain, and the model inference result of the public data on the NWDAF, a service experience requirement that is to be met by the AF domain: [service experience requirement$-(\theta_A x_i^A + \theta_B x_i^B + \theta_C x_i^C + \theta_D x_i^D)$].

In some other embodiments, the PCF determines the sum [$\theta_A x_i^A + \theta_B x_i^B$] of the model inference result of service experience in the core network domain and the model inference result of service experience in the access network domain as the first service experience information.

In another example, in response to the service experience requirement pre-configured by the network is that a service experience MOS score being greater than or equal to 3.0 points, and the maximum service experience requirement that is met by the RAN domain and the CN domain is that the MOS score being less than or equal to 2.0 points, the PCF sends the value 2.0 of the maximum service experience requirement that is met by the network side to the AF.

In some other embodiments, the PCF determines the sum [$\theta_A x_i^A + \theta_B x_i^B + \theta_D x_i^D$] of the model inference result of service experience in the core network domain, the model inference result of service experience in the access network domain, and the inference result of the public data on the NWDAF as the first service experience information.

In some other embodiments, the PCF determines the sum [$\theta_A x_i^A + \theta_B x_i^B + \theta_C x_i^C$] of the model inference result of service experience in the core network domain, the model inference result of service experience in the access network domain, and the model inference result of service experience in the AF domain as the first service experience information.

In some other embodiments, the PCF determines the sum [$\theta_A x_i^A + \theta_B x_i^B + \theta_C x_i^C + \theta_D x_i^D$] of the model inference result of service experience in the core network domain, the model inference result of service experience in the access network domain, the model inference result of service experience in the AF domain, and the model inference result of the public data on the NWDAF as the first service experience information.

In response to each domain not reporting respective public data, the first service experience information herein does not include an inference result of public data, in other words, does not include a local inference result of the NWDA, for example, $\Theta_D x_i^D$.

S308: The PCF sends the first service experience information to the AF.

In at least one embodiment, the PCF triggers the Event Reporting operation of the AF to send the first service experience information to the AF.

S309: The AF receives the first service experience information, and determines an application layer QoS parameter configuration of the service B in the AF domain based on the first service experience information.

In at least one embodiment, the AF determines the local application layer QoS parameter configuration based on the first service experience information [service experience requirement$-(\theta_A x_i^A + \theta_B x_i^B + \theta_D x_i^D)$] and the multi-criteria decision-making algorithm.

In at least one embodiment, the AF determines the local application layer QoS parameter configuration based on the first service experience information [service experience requirement$-(\theta_A x_i^A + \theta_B x_i^B)$] and the multi-criteria decision-making algorithm.

In some other embodiments, the AF first determines, based on the first service experience information [$\theta_A x_i^A +$ $\theta_B x_i^B + \theta_D x_i^D$], that the service experience requirement that is to be met by the AF side is: [service experience requirement$-(\theta_A x_i^A + \theta_B x_i^B + \theta_D x_i^D)$], and further determines the local application layer QoS parameter configuration based on the service experience requirement that is to be met by the AF side and the multi-criteria decision-making algorithm.

In some other embodiments, the AF determines the local application layer QoS parameter configuration based on the first service experience information [service experience requirement$-(\theta_A x_i^A + \theta_B x_i^B)$] and the multi-criteria decision-making algorithm.

In some other embodiments, the AF determines, based on the first service experience information [$\theta_A x_i^A + \theta_B x_i^B$], that the service experience requirement that is to be met by the AF domain is: [service experience requirement$-(\theta_A x_i^A + \theta_B x_i^B)$], and further determines the local application layer QoS parameter configuration based on the service experience requirement that is to be met by the AF domain and the multi-criteria decision-making algorithm.

According to the method in this embodiment, the PCF obtains the model inference result of the terminal for the service B in each domain, and sends the model inference result of the service flow to the application function network element. The application function network element performs parameter adjustment based on the model inference result in each domain, to improve accuracy of adjusting an application layer parameter by the application function network element, and further improve service experience of the service of the terminal.

Embodiments described here are independent solutions, or are combined based on internal logic. All such solutions fall within the protection scope of embodiments described herein.

The network devices in at least one embodiment merely use the RAN, the CN, the AF, and related network elements as examples, and shall not constitute any limitation on embodiments described herein. At least one embodiment does not exclude a possibility of using one or more of the network elements to implement a same or similar function in another application scenario, and at least one embodiment does not exclude a possibility of using one or more other network elements to implement a same or similar function in another application scenario.

In at least one embodiment, "presetting", "pre-configuring", or the like is implemented by pre-storing corresponding code or a table in a device (for example, a network device), or in another manner that is used to indicate related information. A specific implementation is not limited in embodiments described herein, for example, a preset rule or a preset constant in at least one embodiment.

Sequence numbers of the processes do not mean execution sequences in embodiments described herein. The execution sequences of the processes should be determined according to functions and internal logic of the processes, and shall not constitute any limitation on the implementation processes of embodiments described herein.

The communication method provided in at least one embodiment is described from the execution actions of a single device and the interaction behavior between various devices with reference to FIG. 3 to FIG. 5.

The following describes a communication apparatus provided in at least one embodiment with reference to FIG. 6 to FIG. 9. Description of the apparatus embodiments correspond to the descriptions of the method embodiments.

Therefore, for content that is not described in detail, refer to the foregoing method embodiments. For brevity, details are not described herein again.

The foregoing mainly describes the solutions provided in at least one embodiment from a perspective of interaction between network elements. To implement the foregoing functions, each network element includes a corresponding hardware structure and/or software module for executing the functions. A person skilled in the art should be aware that, in combination with the examples described in embodiments disclosed in this specification, units and algorithm steps is implemented by hardware or a combination of hardware and computer software in at least one embodiment. Whether a function is performed by hardware or hardware driven by computer software depends on particular applications and design constraints of the technical solutions. A person skilled in the art uses different methods to implement the described functions for each particular application, but the implementation do not go beyond the scope of embodiments described herein.

In at least one embodiment, functional module division is performed on the transmitting end device or the receiving end device based on the foregoing method example. For example, each functional module is obtained through division corresponding to each function, or two or more functions is integrated in one processing module. The integrated module is implemented in a form of hardware, or is implemented in a form of a software functional module. In at least one embodiment, module division is an example, and is merely a logical function division. During actual implementation, another division manner is used. An example in which each functional module is obtained through division based on each corresponding function is used below for description.

Figure 6:
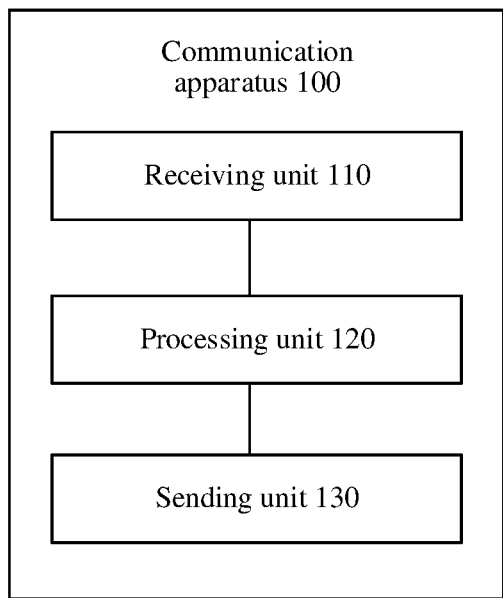
FIG. 6 is a schematic block diagram of a communication apparatus according to at least one embodiment.

FIG. 6 is a schematic diagram of a structure of a communication apparatus 100. The communication apparatus includes a receiving unit 110, a processing unit 120, and a sending unit 130. The communication apparatus 100 is the first network device in the foregoing method embodiments, namely, the data analysis device or the policy control device, or is a chip configured to implement a function of the data analysis device or the policy control device in the foregoing method embodiments.

The communication apparatus 100 corresponds to the first network device in the method 100, the data analysis device in the method 200, and the policy control device in the method 300 according to embodiments described herein. The communication apparatus 100 includes units configured for the method performed by the first network device in the method 100 in FIG. 3, units configured for the method performed by the data analysis device in the method 200 in FIG. 4, and units configured for the method performed by the policy control device in the method 300 in FIG. 5. In addition, the units in the communication apparatus 100 and the foregoing other operations and/or functions are respectively used to implement corresponding procedures of the method 100 in FIG. 3, the method 200 in FIG. 4, and the method 300 in FIG. 5.

The communication apparatus 100 implements the communication methods in embodiments shown in the first network device in FIG. 1, the data analysis device NWDAF in FIG. 4, and the policy control device PCF in FIG. 5, and includes:

a receiving unit 110, configured to obtain first information from a second network device, where the first information includes a first analysis result of first data that is of a terminal and that is on the second network device; and the receiving unit 110 is configured to obtain second information from a third network device, where the second information includes a second analysis result of first data that is of the terminal and that is on the third network device;

a processing unit 120, configured to determine first experience information of a service of the terminal based on the first information and the second information; and a sending unit 130, configured to send the first experience information to a fourth network device, where the first experience information is for determining a parameter that is of the service of the terminal and that is on the fourth network device.

In at least one embodiment, a specific implementation further includes:

The sending unit 130 is configured to send a first request to the second network device, where the first request is for requesting the first analysis result of the first data that is of the terminal and that is on the core network device, the first request includes first identification information of the terminal and at least one of the following information: an analysis identifier and identification information of a first model, and the analysis identifier and/or the identification information of the first model is for determining the first model corresponding to the first analysis result of the first data that is of the terminal and that is on the core network device.

In at least one embodiment, a specific implementation further includes:

The sending unit 130 is configured to send a second request to the third network device, where the second request is for requesting the second analysis result of the first data that is of the terminal and that is on the third network device, the second request includes second identification information of the terminal and at least one of the following information: the analysis identifier and identification information of a second model, the analysis identifier and/or the identification information of the second model is for determining the second model corresponding to the second analysis result of the first data that is of the terminal and that is on the third network device, and the third network device includes an access network device.

In at least one embodiment, a specific implementation further includes:

The receiving unit 110 is configured to obtain third information from the fourth network device, where the third information includes a third analysis result of first data that is of the terminal and that is on the fourth network device.

In at least one embodiment, a specific implementation further includes:

The sending unit 130 is configured to send a third request to the fourth network device, where the third request is for requesting the third analysis result of the first data that is of the terminal and that is on the fourth network device, the third request includes a third identifier of the terminal and at least one of the following information: the analysis identifier and identification information of a third model, the analysis identifier and/or the identification information of the third model is for determining the third model corresponding to the third analysis result of the first data that is of the terminal and that is on the fourth network device, and the fourth network device includes an application function device.

In at least one embodiment, the first information further includes first association information, where the first association information is for associating the second information with the first information; and/or the second information further includes the first association information.

In at least one embodiment, the first information further includes second association information, and the second association information is for associating the first information with the third information; and/or the third information further includes the second association information.

In at least one embodiment, a specific implementation further includes:

the first information further includes second data that is of the terminal and that is on the second network device, and the second information further includes second data that is of the terminal and that is on the third network device;

the processing unit 120 is configured to obtain a fourth analysis result based on the second data that is of the terminal and that is on the second network device and the second data that is of the terminal and that is on the third network device; and the processing unit 120 is configured to determine the first service experience information of the service of the terminal based on the first information, the second information, and the fourth analysis result.

In at least one embodiment, a specific implementation further includes: The third information further includes second data that is of the terminal and that is on the fourth network device.

The processing unit 120 is configured to determine the first service experience information of the service of the terminal based on the first information, the second information, the third information, and the fourth analysis result.

In at least one embodiment, a specific implementation further includes:

The processing unit 120 is configured to determine the first experience information based on the first information, the second information, and second experience information of the service requirement.

Figure 7:
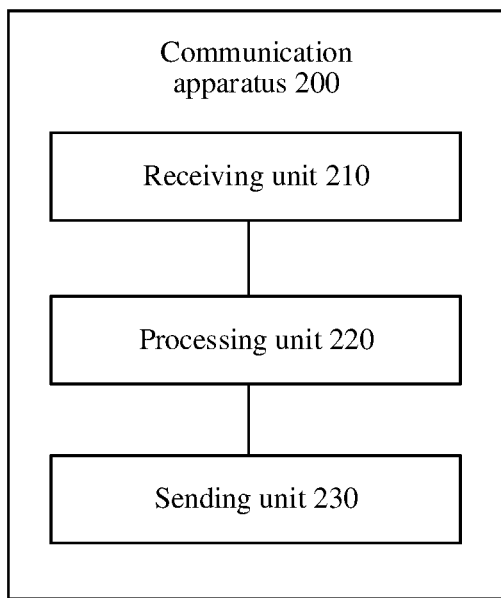
FIG. 7 is a schematic block diagram of another communication apparatus according to at least one embodiment.

FIG. 7 is a schematic diagram of a structure of a communication apparatus 200. The communication apparatus includes a receiving unit 210, a processing unit 220, and a sending unit 230. The communication apparatus 100 is the second network device in the foregoing method embodiments, for example, a core network device, is the third network device, for example, an access network device, or is a chip configured to implement a function of the core network device or the access network device in the foregoing method embodiments.

The communication apparatus 200 corresponds to the second network device or the third network device in the method 100 in at least one embodiment, the core network device or the access network device in the method 200, or the core network device or the access network device in the method 300. The communication apparatus 200 includes units configured for the method performed by the second network device or the third network device in the method 100 in FIG. 3, units configured for the method performed by the core network device or the access network device in the method 200 in FIG. 4, and units configured for the method performed by the core network device or the access network device in the method 300 in FIG. 5. In addition, the units in the communication apparatus 200 and the foregoing other operations and/or functions are respectively used to implement corresponding procedures of the method 100 in FIG. 3, the method 200 in FIG. 4, and the method 300 in FIG. 5. A specific process in which the units perform the foregoing corresponding steps is described in detail in the foregoing method embodiments, and for brevity, details are not described herein.

Figure 8:
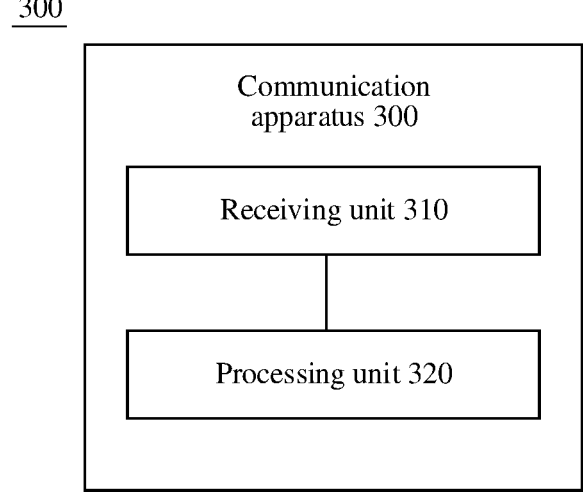
FIG. 8 is a schematic block diagram of another communication apparatus according to at least one embodiment.

FIG. 8 is a schematic diagram of a structure of a communication apparatus 300. The communication apparatus includes a receiving unit 310 and a processing unit 320. The communication apparatus 300 is the fourth network device in the foregoing method embodiments, namely, the application function device, or is a chip configured to implement a function of the application function device in the foregoing method embodiments.

The communication apparatus 300 corresponds to the fourth network device in the method 100, the application function device in the method 200, and the application function device in the method 300 according to embodiments described herein. The communication apparatus 300 includes units configured for the method performed by the fourth network device in the method 100 in FIG. 3, units configured for the method performed by the application function device in the method 200 in FIG. 4, and units configured for the method performed by the application function device in the method 300 in FIG. 5. In addition, the units in the communication apparatus 300 and the foregoing other operations and/or functions are respectively used to implement corresponding procedures of the method 100 in FIG. 3, the method 200 in FIG. 4, and the method 300 in FIG. 5. A specific process in which the units perform the foregoing corresponding steps is described in detail in the foregoing method embodiments, and for brevity, details are not described herein.

Figure 9:
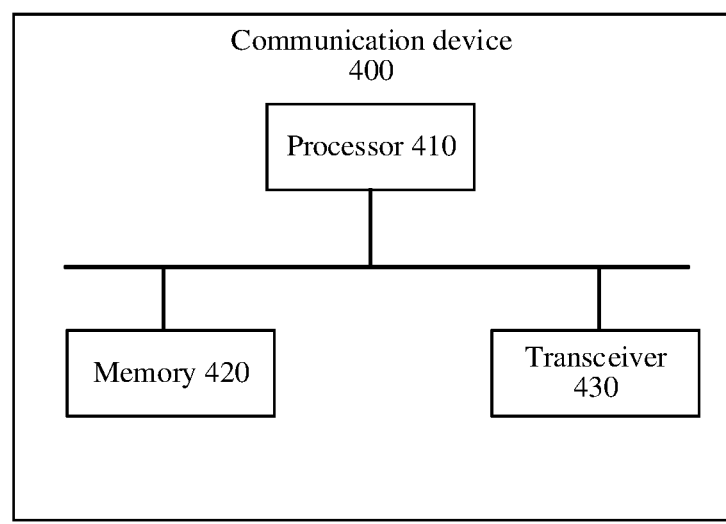
FIG. 9 is a schematic diagram of a structure of a communication device according to at least one embodiment.

FIG. 9 is a block diagram of a structure of a communication device 400 according to at least one embodiment. The communication device 400 shown in FIG. 9 includes a processor 410, a memory 420, and a transceiver 430. The processor 410 is coupled to the memory, and is configured to execute instructions stored in the memory, to control the transceiver 430 to send a signal and/or receive a signal.

The processor 410 and the memory 420 are integrated into one processing apparatus, and the processor 410 is configured to execute program code stored in the memory 420, to implement the foregoing functions. During specific implementation, the memory 420 is alternatively integrated into the processor 410, or independent of the processor 410. It should be understood that, the processor 410 alternatively corresponds to each processing unit in the foregoing communication apparatus, and the transceiver 430 corresponds to each receiving unit and each sending unit in the foregoing communication apparatus.

The transceiver 430 includes a receiver (also referred to as a receiver machine) and a transmitter (also referred to as a transmitter machine). The transceiver further includes an antenna. There is one or more antennas. The transceiver 430 is alternatively a communication interface or an interface circuit.

In at least one embodiment, the communication device 400 is the first network device in the foregoing method embodiments, or is a chip configured to implement a function of the first network device in the foregoing method embodiments.

Specifically, the communication device 400 corresponds to the first network device in the method 100, the data analysis device in the method 200, and the policy control device in the method 300 according to embodiments described herein. The communication device 400 includes units configured for the method performed by the first network device in the method 100 in FIG. 3, units configured for the method performed by the data analysis device in the method 200 in FIG. 4, and units configured for the method performed by the policy control device in the method 300 in FIG. 5. In addition, the units in the communication device 400 and the foregoing other operations and/or functions are respectively used to implement corresponding procedures of the method 100 in FIG. 3, the method 200 in FIG. 4, and the method 300 in FIG. 5. A specific process in which the units perform the foregoing corresponding steps is described in detail in the foregoing method embodiments, and for brevity, details are not described herein.

In at least one embodiment, the communication device 400 is the second network device, the third network device, or the fourth network device in the foregoing method embodiments, or is a chip configured to implement a function of the second network device, the third network device, or the fourth network device in the foregoing method embodiments.

The communication device 400 corresponds to the second network device, the third network device, or the fourth network device in the method 100, the core network device, the access network device, or the application function device in the method 200, or the core network device, the access network device, or the application function device in the method 300 according to embodiments described herein. The communication device 200 includes units configured for the method performed by the second network device, the third network device, or the fourth network device in the method 100 in FIG. 3, units configured for the method performed by the core network device, the access network device, or the application function device in the method 200 in FIG. 4, and units configured for the method performed by the core network device, the access network device, or the application function device in the method 300 in FIG. 5. In addition, the units in the communication device 400 and the foregoing other operations and/or functions are respectively used to implement corresponding procedures of the method 100 in FIG. 3, the method 200 in FIG. 4, and the method 300 in FIG. 5. A specific process in which the units perform the foregoing corresponding steps is described in detail in the foregoing method embodiments, and for brevity, details are not described herein.

In response to the communication device 400 being a chip, the chip includes a transceiver unit and a processing unit. The transceiver unit is an input/output circuit or a communication interface. The processing unit is a processor, a microprocessor, or an integrated circuit that is integrated on the chip. At least one embodiment further provides a processing apparatus, including a processor and an interface. The processor is configured to perform the method in the foregoing method embodiments.

The processing apparatus is a chip. For example, the processing apparatus is a field programmable gate array (FPGA), an application-specific integrated chip (ASIC), a system on chip (SoC), a central processing unit (CPU), a network processor (NP), a digital signal processor (DSP), a micro controller unit (MCU), a programmable logic device (PLD), or another integrated chip.

In an implementation process, steps in the foregoing methods is implemented by using a hardware integrated logical circuit in the processor, or by using instructions in a form of software. The steps of the method disclosed with reference to embodiments described herein are directly performed by a hardware processor, or are performed by using a combination of hardware in the processor and a software module. A software module is located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

The processor in at least one embodiment is an integrated circuit chip, and has a signal processing capability. In an implementation process, steps in the foregoing method embodiments is implemented by using a hardware integrated logical circuit in the processor, or by using instructions in a form of software. The processor is a general-purpose processor, a digital signal processor (DSP), an application-specific integrated circuit (ASIC), a field programmable gate array (FPGA) or another programmable logic device, a discrete gate or a transistor logic device, or a discrete hardware component. The processor implements or perform the methods, the steps, and logical block diagrams that are disclosed in at least one embodiment. The general-purpose processor is a microprocessor, or the processor is any conventional processor or the like. Steps of the methods disclosed with reference to embodiments described herein are directly executed and accomplished by a hardware decoding processor, or are executed and accomplished by using a combination of hardware and software modules in the decoding processor. A software module is located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

The memory in at least one embodiment is a volatile memory or a nonvolatile memory, or includes a volatile memory and a nonvolatile memory. The nonvolatile memory is a read-only memory (ROM), a programmable read-only memory (PROM), an erasable programmable read-only memory (EPROM), an electrically erasable programmable read-only memory (EEPROM), or a flash memory. The volatile memory is a random access memory (RAM), used as an external cache. Through example but not limitative description, many forms of RAMs is used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). The memory of the systems and methods described herein include but are not limited to these and any memory of another proper type.

According to the method provided in at least one embodiment, a computer program product is provided. The computer program product includes computer program code. In response to the computer program code being run on a computer, the computer is enabled to perform the method according to any of embodiments shown in FIG. 3, FIG. 4, or FIG. 5.

According to the method provided in at least one embodiment, a computer-readable medium is provided. The computer-readable medium stores program code. In response to the program code being run on a computer, the computer is enabled to perform the method according to any of embodiments shown in FIG. 3, FIG. 4, or FIG. 5.

According to the method provided in at least one embodiment, this application further provides a system. The system includes the foregoing apparatus or device.

All or some of the foregoing embodiments is implemented by using software, hardware, firmware, or any combination thereof. In response to software being used to implement embodiments, all or a part of embodiments is implemented in a form of a computer program product. The computer program product includes one or more computer instructions. In response to the computer instructions being loaded and executed on the computer, the procedure or functions according to embodiments described herein are all or partially generated. The computer is a general-purpose computer, a dedicated computer, a computer network, or another programmable apparatus. The computer instructions is stored in a computer-readable storage medium or is transmitted from a computer-readable storage medium to another computer-readable storage medium. For example, the computer instructions is transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium is any usable medium accessible by the computer, or a data storage device, for example, a server or a data center, integrating one or more usable media. The usable medium is a magnetic medium (for example, a floppy disk, a hard disk drive, or a magnetic tape), an optical medium (for example, a digital video disc (DVD)), a semiconductor medium (for example, a solid state disc (SSD)), or the like.

The network side device and the terminal device in the foregoing apparatus embodiments correspond to the network side device or the terminal device in the method embodiments. A corresponding module or unit performs a corresponding step. For example, a communication unit (a transceiver) performs a receiving step or a sending step in the method embodiments, and a step other than the sending step and the receiving step is performed by a processing unit (a processor). For a function of a specific unit, refer to a corresponding method embodiment. There is one or more processors.

Terms such as "component", "module", and "system" used in this specification are used to indicate computer-related entities, hardware, firmware, combinations of hardware and software, software, or software being executed. For example, a component is, but is not limited to, a process that runs on a processor, a processor, an object, an executable file, an execution thread, a program, and/or a computer. As illustrated by using figures, both a computing device and an application that runs on the computing device is components. One or more components may reside within a process and/or a thread of execution, and a component is located on one computer and/or distributed between two or more computers. In addition, these components is executed from various computer-readable media that store various data structures. For example, the components communicates by using a local and/or remote process and based on, for example, a signal having one or more data packets (for example, data from two components interacting with another component in a local system, a distributed system, and/or across a network such as the Internet interacting with other systems by using the signal).

The term "and/or" in this specification describes only an association relationship for describing associated objects and represents that three relationships exist. For example, A and/or B represent the following three cases: Only A exists, both A and B exist, and only B exists. In addition, the character "/" in this specification generally indicates an "or" relationship between the associated objects.

Numbers "first" and "second" are introduced in at least one embodiment to distinguish between different objects, for example, to distinguish between different "devices" or "units", but do not constitute a limitation on embodiments described herein.

A person of ordinary skill in the art is aware that, in combination with the examples described in embodiments disclosed in this specification, units and algorithm steps is implemented by electronic hardware or a combination of computer software and electronic hardware. Whether the functions are performed by hardware or software depends on particular applications and design constraint conditions of the technical solutions. A person skilled in the art uses different methods to implement the described functions for at least one embodiment, but the implementation does not go beyond the scope of embodiments described herein.

A person skilled in the art understands that, for the purpose of convenient and brief description, for a detailed working process of the foregoing system, apparatus, and unit, refer to a corresponding process in the foregoing method embodiments. Details are not described herein again.

In the several embodiments described herein, the disclosed system, apparatus, and method are implemented in other manners. For example, the described apparatus embodiment is merely an example. For example, division into the units is merely logical function division and is other division during actual implementation. For example, a plurality of units or components is combined or integrated into another system, or some features is ignored or not performed. In addition, the displayed or discussed mutual couplings or direct couplings or communication connections is implemented by using some interfaces. The indirect couplings or communication connections between the apparatuses or units is implemented in electronic, mechanical, or other forms.

The units described as separate parts may or may not be physically separate, and parts displayed as units may or may not be physical units, is located in one position, or is distributed on a plurality of network units. Some or all of the units is selected based on actual requirements to achieve the objectives of the solutions of embodiments.

In addition, functional units in at least one embodiment are integrated into one processing unit, each of the units exist alone physically, or two or more units are integrated into one unit.

In response to the functions being implemented in the form of a software functional unit and sold or used as an independent product, the functions is stored in a computer-readable storage medium. Based on such an understanding, the technical solutions of embodiments described herein essentially, or the part contributing to the current technology, or some of the technical solutions is implemented in a form of a software product. The computer software product is stored in a storage medium, and includes several instructions for instructing a computer device (which is a personal computer, a server, or a network device) to perform all or some of the steps of the methods described in at least one embodiment. The foregoing storage medium includes any medium that stores program code, such as a USB flash drive, a removable hard disk, a read-only memory (ROM), a random access memory (RAM), a magnetic disk, or an optical disc.

The foregoing descriptions are merely specific implementations embodiments described herein, but are not intended to limit the protection scope such embodiments. Any variation or replacement readily figured out by a person skilled in the art within the technical scope disclosed in at least one embodiment falls within the protection scope of the claims. Therefore, the protection scope of embodiment described herein are subject to the protection scope of the claims.

What is claimed is:

1. A communication method, comprising:

obtaining, by a first network device, first information from a second network device, wherein the first information includes a first analysis result of first data that is a first model inference of a service experience of a terminal and that is on the second network device;

obtaining, by the first network device, second information from a third network device, wherein the second information includes a second analysis result of first data that is a second model inference of a service experience of the terminal and that is on the third network device;

determining, by the first network device, first service experience information of a service of the terminal based on the first information and the second information; and sending, by the first network device, the first service experience information to a fourth network device, wherein the first service experience information is for determining, based on multi-objective optimization, a parameter that is of the service of the terminal and that is on the fourth network device.

2. The method according to claim 1, wherein the second network device includes a core network device, and the method further comprises:

sending, by the first network device, a first request to the core network device, wherein the first request is for requesting the first analysis result of the first data that is of the terminal and that is on the core network device, the first request includes first identification information of the terminal and at least one of the following information: an analysis identifier and identification information of a first model, and the analysis identifier and/or the identification information of the first model is for determining the first model corresponding to the first analysis result of the first data that is of the terminal and that is on the core network device.

3. The method according to claim 1, wherein the third network device includes an access network device, and the method further comprises:

sending, by the first network device, a second request to the access network device, wherein the second request is for requesting the second analysis result of the first data that is of the terminal and that is on the access network device, the second request includes second identification information of the terminal and at least one of the following information: the analysis identifier and identification information of a second model, and the analysis identifier and/or the identification information of the second model is for determining the second model corresponding to the second analysis result of the first data that is of the terminal and that is on the access network device.

4. The method according to claim 1, wherein the method further comprises:

obtaining, by the first network device, third information from the fourth network device, wherein the third information includes a third analysis result of first data that is of the terminal and that is on the fourth network device.

5. The method according to claim 4, wherein the obtaining the third information including the first data that is of the terminal and that is on the fourth network device includes obtaining the third information including first data that is private data corresponding to the terminal.

6. The method according to claim 4, wherein the fourth network device includes an application function device, and the method further comprises:

sending, by the first network device, a third request to the application function device, wherein the third request is for requesting the third analysis result of the first data that is of the terminal and that is on the application function device, the third request includes a third identifier of the terminal and at least one of the following information: the analysis identifier and identification information of a third model, and the analysis identifier and/or the identification information of the third model is for determining the third model corresponding to the third analysis result of the first data that is of the terminal and that is on the application function device.

7. The method according to claim 4, wherein the obtaining the third information including the first information further includes obtaining the third information including second association information, and the second association information is for associating the first information with the third information; and/or the third information further includes the second association information.

8. The method according to claim 1, wherein the obtaining the first information further includes obtaining first association information, and the first association information is for associating the second information with the first information; and/or the second information further includes the first association information.

9. The method according to claim 1, wherein the first information further includes second data that is of the terminal and that is on the second network device, the second information further includes second data that is of the terminal and that is on the third network device, and the method further comprises:

obtaining, by the first network device, a fourth analysis result based on the second data that is of the terminal and that is on the second network device and the second data that is of the terminal and that is on the third network device; and the determining, by the first network device, first service experience information of a service of the terminal based on the first information and the second information includes:

determining, by the first network device, the first service experience information of the service of the terminal based on the first information, the second information, and the fourth analysis result.

10. The method according to claim 9, wherein the obtaining the fourth analysis result based on the second data that is of the terminal and that is on the second network device includes obtaining the fourth analysis result based on public data corresponding to the terminal, and the second data that is of the terminal and that is on the third network device includes the public data corresponding to the terminal.

11. The method according to claim 9, wherein the third information further comprises second data that is of the terminal and that is on the fourth network device;

wherein the obtaining, by the first network device, a fourth analysis result based on the second data that is of the terminal and that is on the second network device and the second data that is of the terminal and that is on the third network device includes:

obtaining, by the first network device, the fourth analysis result based on the second data that is of the terminal and that is on the second network device, the second data that is of the terminal and that is on the third network device, and the second data that is of the terminal and that is on the fourth network device; and wherein the determining, by the first network device, the first service experience information of the service of the terminal based on the first information, the second information, and the fourth analysis result includes:

determining, by the first network device, the first service experience information of the service of the terminal based on the first information, the second information, the third information, and the fourth analysis result.

12. A communication apparatus comprising:

a memory configured to store instructions; and a processor coupled to the memory and configured to execute the instructions to cause the processor to perform operations to:

obtain first information from a second network device, wherein the first information includes a first analysis result of first data that is a first model inference of a service experience of a terminal and that is on the second network device;

obtain second information from a third network device, wherein the second information includes a second analysis result of first data that is a second model inference of a service experience of the terminal and that is on the third network device;

determine first service experience information of a service of the terminal based on the first information and the second information; and send the first service experience information to a fourth network device, wherein the first service experience information is for determining, based on multi-objective optimization, a parameter that is of the service of the terminal and that is on the fourth network device.

13. The communication apparatus according to claim 12, wherein the second network device includes a core network device, wherein the processor is further configured to:

send a first request to the core network device, wherein the first request is for requesting the first analysis result of the first data that is of the terminal and that is on the core network device, the first request includes first identification information of the terminal and at least one of the following information: an analysis identifier and identification information of a first model, and the analysis identifier and/or the identification information of the first model is for determining the first model corresponding to the first analysis result of the first data that is of the terminal and that is on the core network device.

14. The communication apparatus according to claim 12, wherein the third network device includes an access network device, wherein the processor is further configured to:

send a second request to the access network device, wherein the second request is for requesting the second analysis result of the first data that is of the terminal and that is on the access network device, the second request includes second identification information of the terminal and at least one of the following information: the analysis identifier and identification information of a second model, and the analysis identifier and/or the identification information of the second model is for determining the second model corresponding to the second analysis result of the first data that is of the terminal and that is on the access network device.

15. The communication apparatus according to claim 12, wherein the processor is further configured to:

obtain third information from the fourth network device, wherein the third information includes a third analysis result of first data that is of the terminal and that is on the fourth network device.

16. The communication apparatus according to claim 15, wherein the processor is further caused to:

send a third request to the application function device, wherein the third request is for requesting the third analysis result of the first data that is of the terminal and that is on the application function device, the third request includes a third identifier of the terminal and at least one of the following information: the analysis identifier and identification information of a third model, and the analysis identifier and/or the identification information of the third model is for determining the third model corresponding to the third analysis result of the first data that is of the terminal and that is on the application function device.

17. The communication apparatus according to claim 15, wherein the first information further includes second association information, and the second association information is for associating the first information with the third information; and/or the third information further comprises the second association information.

18. The communication apparatus according to claim 12, wherein the first information further includes first association information, and the first association information is for associating the second information with the first information; and/or the second information further includes the first association information.

19. The communication apparatus according to claim 12, wherein second data that is of the terminal and that is on the second network device includes public data corresponding to the terminal, and the second data that is of the terminal and that is on the third network device includes public data corresponding to the terminal.

20. A communication system, comprising:

a first network device; and a second network device;

wherein the first network device is configured to obtain, by a first network device, first information from a second network device, wherein the first information includes a first analysis result of first data that is a first model inference of a service experience of a terminal and that is on the second network device, obtain, by the first network device, second information from a third network device, wherein the second information includes a second analysis result of first data that is a second model inference of a service experience of the terminal and that is on the third network device, determine, by the first network device, first service experience information of a service of the terminal based on the first information and the second information, and send, by the first network device, the first service experience information to a fourth network device, wherein the first service experience information is for determining, based on multi-objective optimization, a parameter that is of the service of the terminal and that is on the fourth network device; and wherein the second network device is configured to send first information to the first network device, and the first information includes a first analysis result of first data that is of a terminal and that is on the second network device.

* * * * *